United States Patent
Matsumura et al.

(10) Patent No.: US 11,909,465 B2
(45) Date of Patent: Feb. 20, 2024

(54) TERMINAL AND RADIO COMMUNICATION METHOD

(71) Applicant: NTT DOCOMO, INC., Tokyo (JP)

(72) Inventors: Yuki Matsumura, Tokyo (JP); Satoshi Nagata, Tokyo (JP); Shaozhen Guo, Beijing (CN); Jing Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 17/775,109

(22) PCT Filed: Nov. 8, 2019

(86) PCT No.: PCT/JP2019/044019
§ 371 (c)(1),
(2) Date: May 6, 2022

(87) PCT Pub. No.: WO2021/090506
PCT Pub. Date: May 14, 2021

(65) Prior Publication Data
US 2022/0393724 A1    Dec. 8, 2022

(51) Int. Cl.
*H04B 7/0413*    (2017.01)
*H04B 7/06*    (2006.01)
(Continued)

(52) U.S. Cl.
CPC .............. *H04B 7/0413* (2013.01); *H04B 7/06* (2013.01); *H04B 7/08* (2013.01); *H04W 16/28* (2013.01);
(Continued)

(58) Field of Classification Search
CPC .......... H04B 7/0413; H04B 7/06; H04B 7/08; H04W 72/23; H04W 16/28; H04W 72/1273
See application file for complete search history.

(56) References Cited

U.S. PATENT DOCUMENTS

2021/0385832 A1*  12/2021  Zhang ............... H04W 72/1263
2022/0109541 A1*   4/2022  Cirik .................... H04L 5/0053
(Continued)

FOREIGN PATENT DOCUMENTS

WO    2020-225691 A1    11/2020

OTHER PUBLICATIONS

Office Action issued in Japanese Patent Application No. 2021-554795, dated Apr. 18, 2023 (8 pages).
(Continued)

*Primary Examiner* — Janice N Tieu
(74) *Attorney, Agent, or Firm* — Osha Bergman Watanabe & Burton LLP

(57) ABSTRACT

A terminal according to an aspect of the present disclosure includes a receiving section that receives one piece of downlink control information (DCI) for scheduling a plurality of downlink shared channels (PDSCHs), and a control section that determines either a single TCI state or a plurality of TCI states for the plurality of PDSCHs in at least one of a first case and a second case, the first case being a case that a time offset from the DCI to the plurality of PDSCHs is shorter than a threshold, the second case being a case that a transmission configuration indication (TCI) field is not configured. According to an aspect of the present disclosure, QCL parameters for multi-panel/TRP can be appropriately determined.

7 Claims, 11 Drawing Sheets

(51) Int. Cl.
*H04B 7/08* (2006.01)
*H04W 72/1273* (2023.01)
*H04W 72/23* (2023.01)
*H04W 16/28* (2009.01)

(52) U.S. Cl.
CPC ....... *H04W 72/1273* (2013.01); *H04W 72/23* (2023.01)

(56) References Cited

U.S. PATENT DOCUMENTS

2022/0322362 A1 10/2022 Muruganathan et al.
2022/0337344 A1* 10/2022 Gao ................... H04L 5/0051

OTHER PUBLICATIONS

Huawei, HiSilicon; "Enhancements on multi-TRP/panel transmission"; 3GPP TSG RAN WG1 Meeting #98bis, R1-1910073; Chongqing, China; Oct. 14-20, 2019 (29 pages).

Office Action issued in Japanese Patent Application No. 2021-554795, dated Jun. 20, 2023 (6 pages).
International Search Report issued in PCT/JP2019/044019 dated Dec. 10, 2019 (2 pages).
Written Opinion of the International Searching Authority issued in PCT/JP2019/044019 dated Dec. 10, 2019 (4 pages).
ZTE; "Considerations on beam management for multi-TRP"; 3GPP TSG RAN WG1 #97, R1-1906244; Reno, USA; May 13-17, 2019 (8 pages).
NTT Docomo, Inc; "Enhancements on multi-TRP/panel transmission"; 3GPP TSG RAN WG1 #97, R1-1906224; Reno, USA; May 13-17, 2019 (7 pages).
NTT Docomo, Inc.; "Enhancements on multi-TRP/panel transmission"; 3GPP TSG RAN WG1 #98, R1-1909201; Prague, CZ; Aug. 26-30, 2019 (5 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E- UTRAN); Overall description; Stage 2 (Release 8)"; Mar. 2010 (149 pages).

* cited by examiner

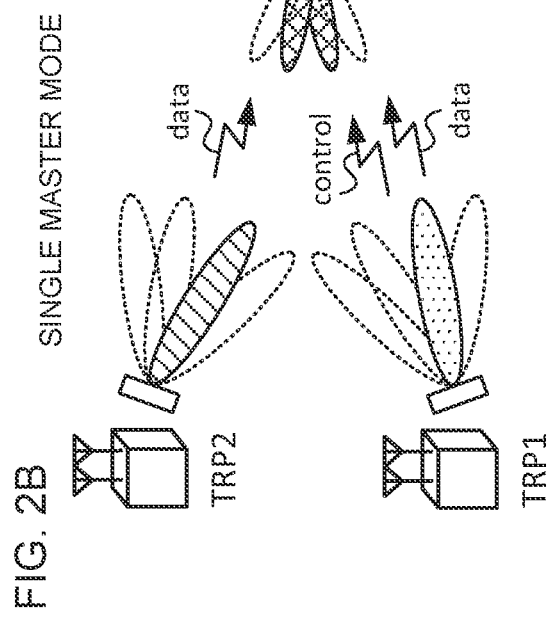
FIG. 2A SINGLE MODE
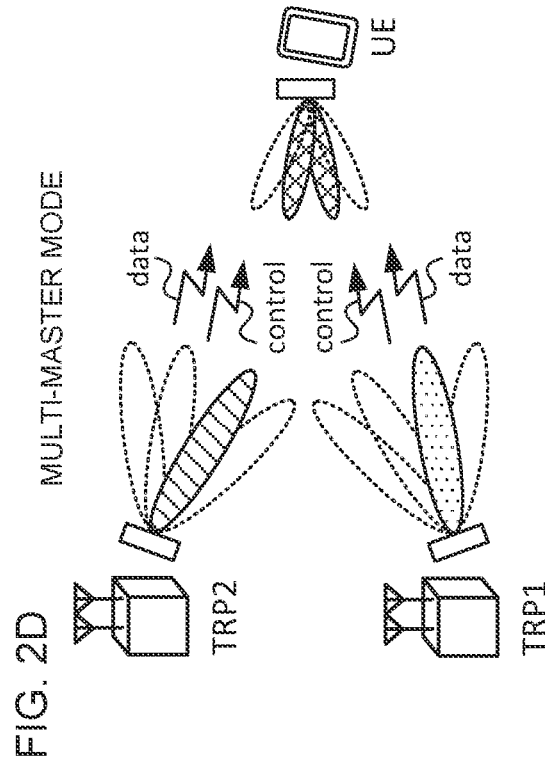
FIG. 2B SINGLE MASTER MODE
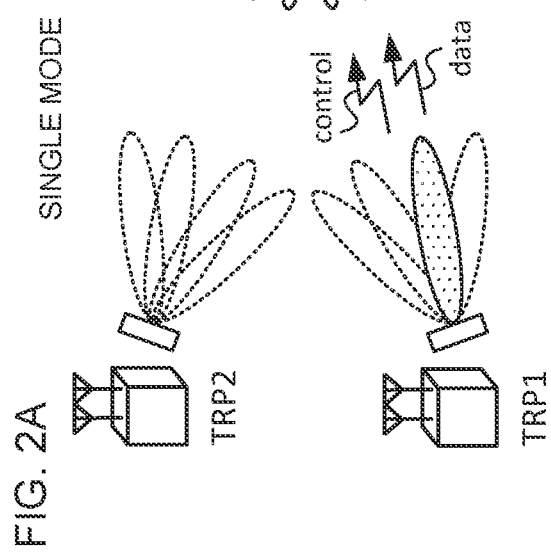
FIG. 2C MASTER SLAVE MODE
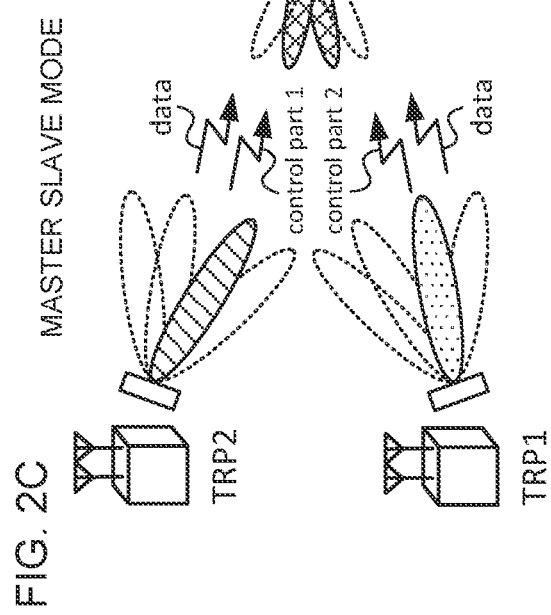
FIG. 2D MULTI-MASTER MODE

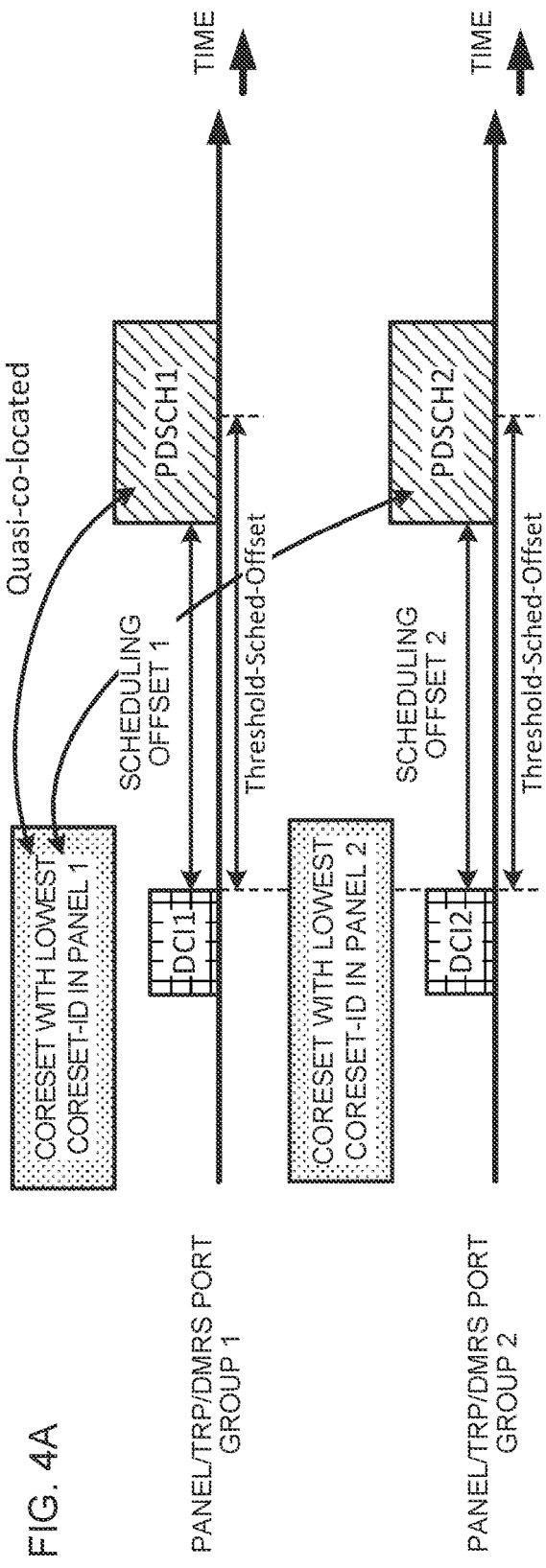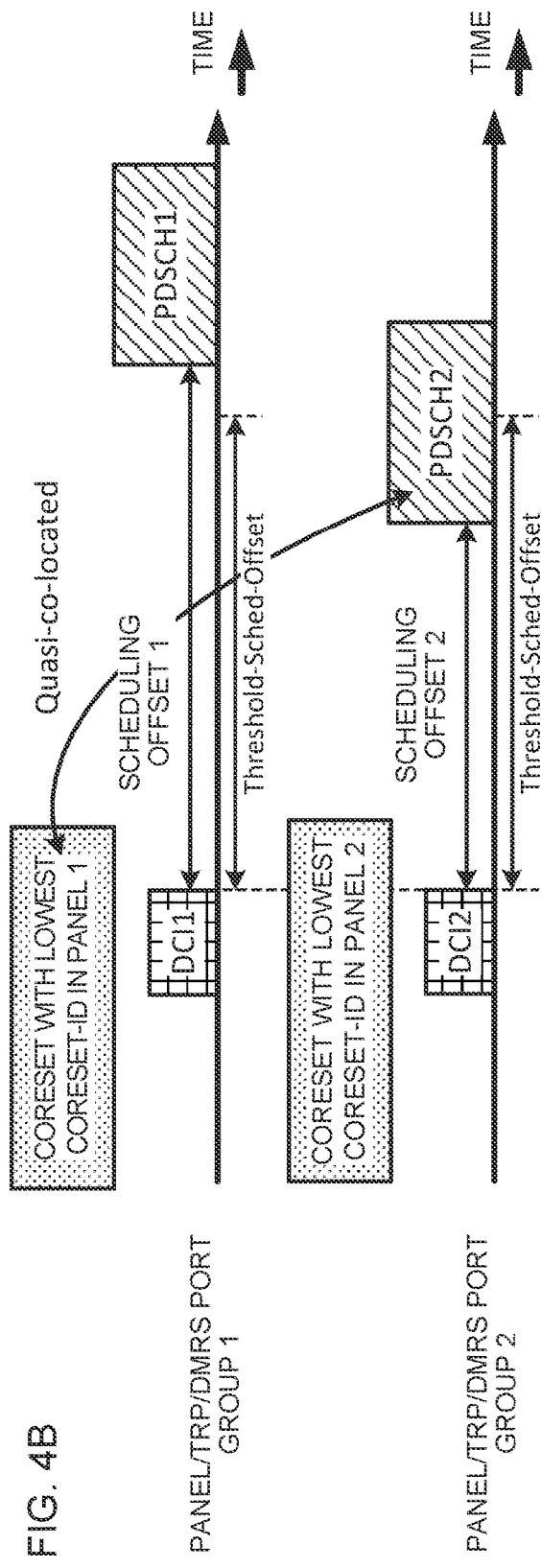

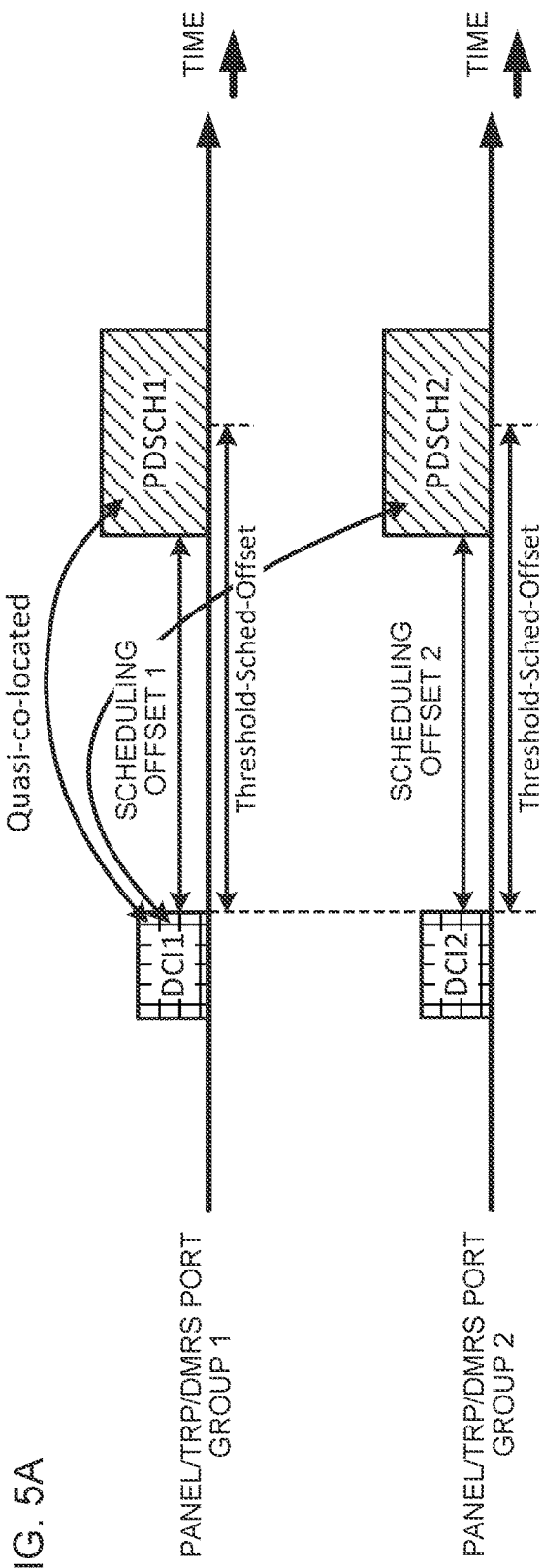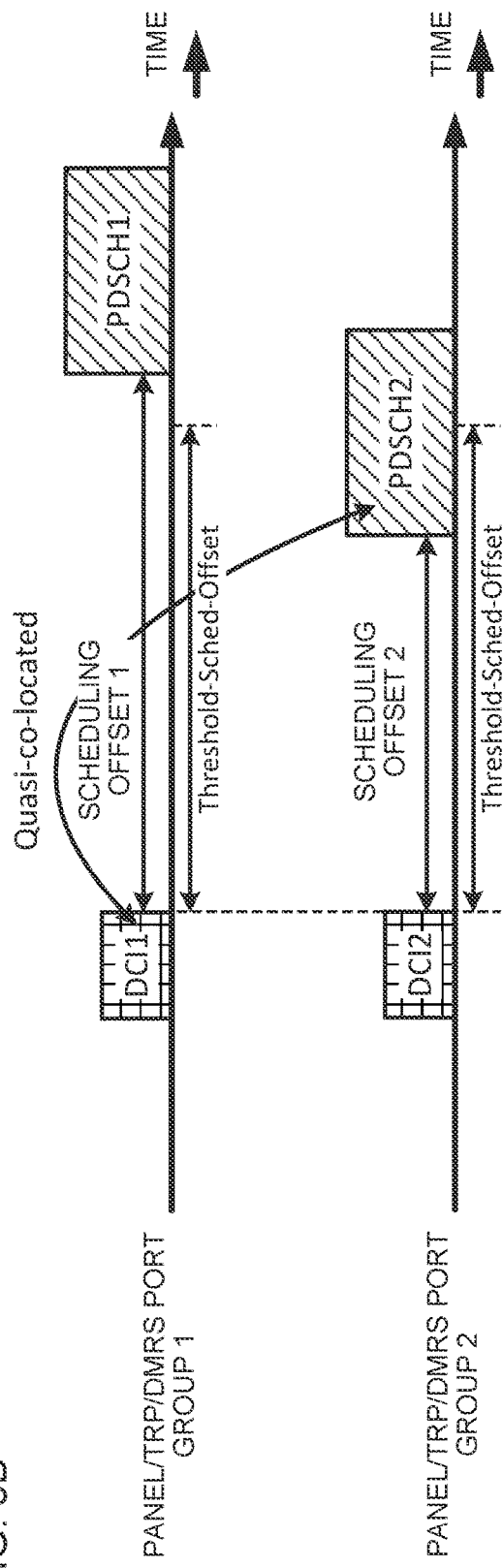

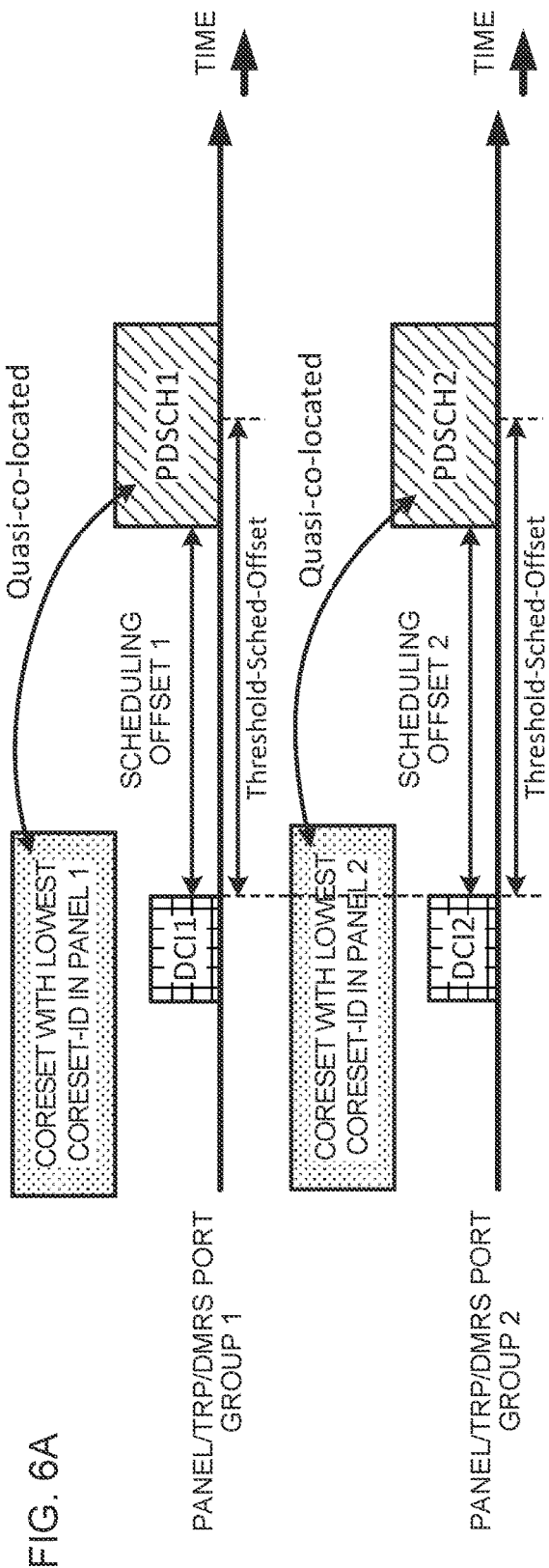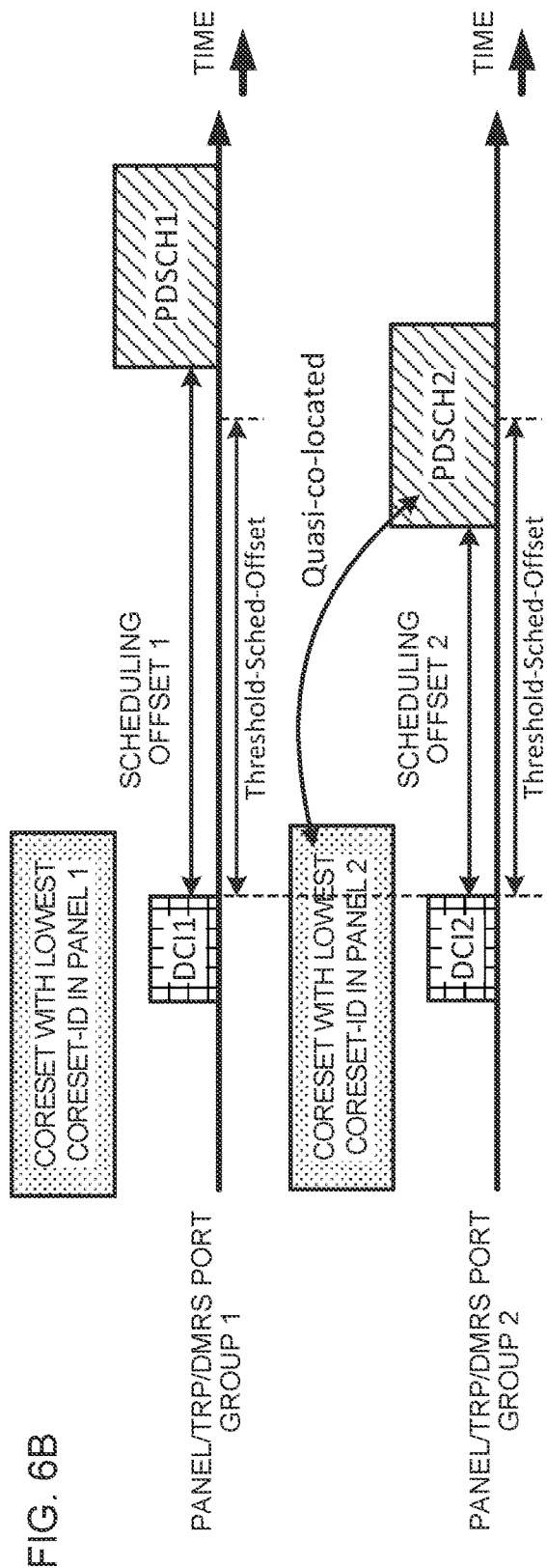

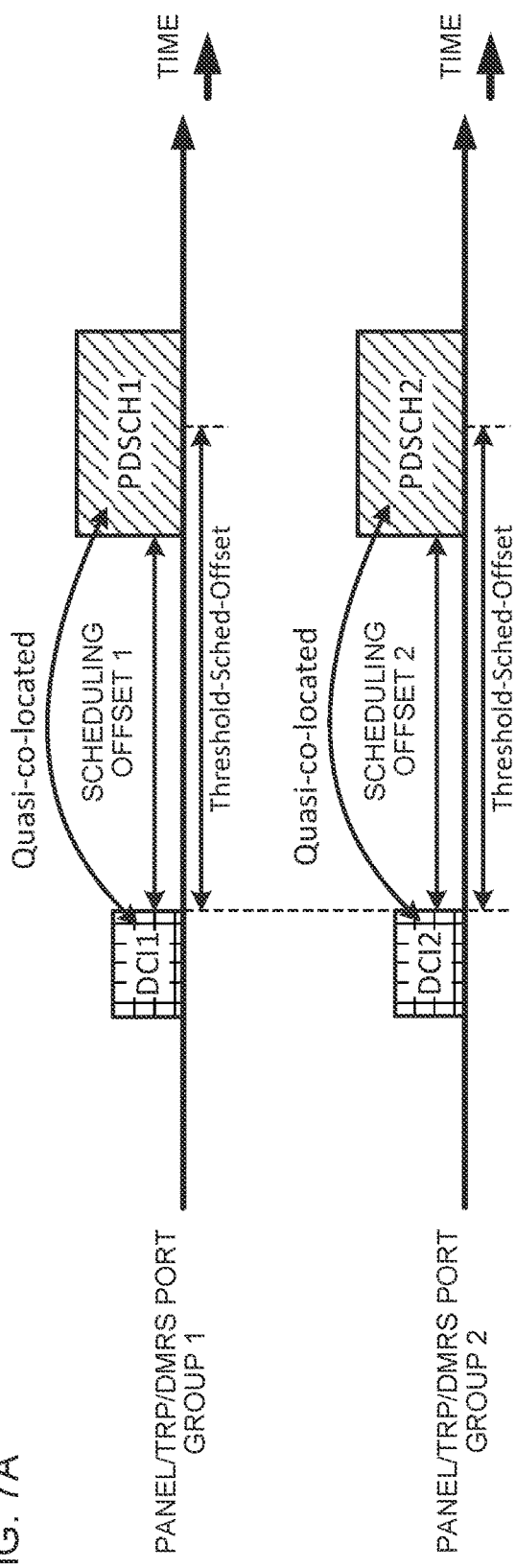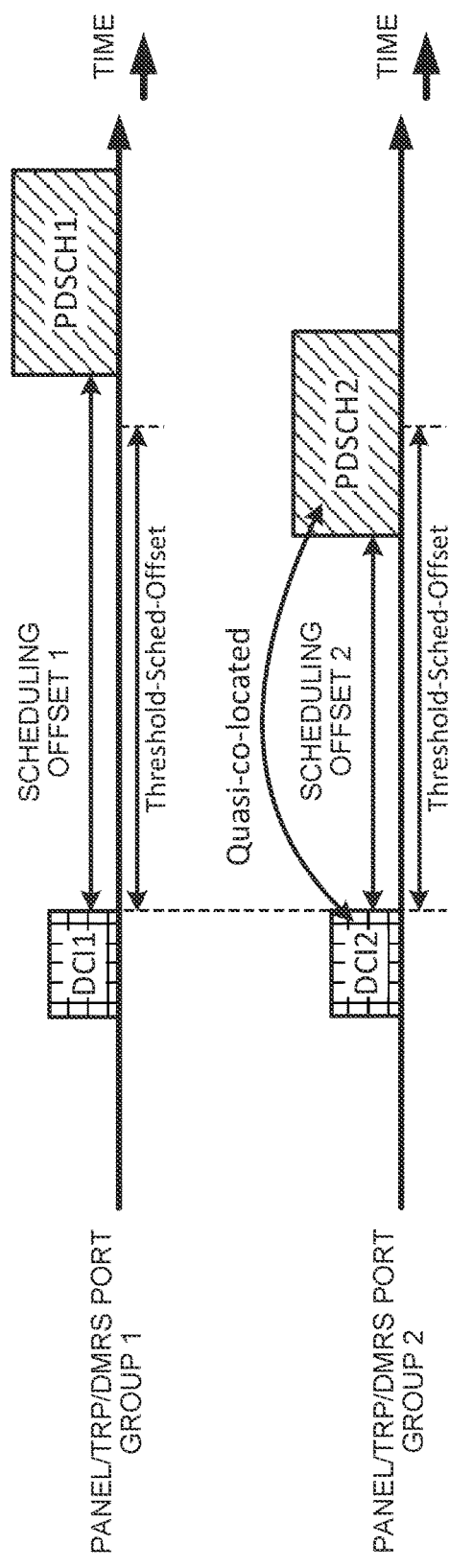

TERMINAL AND RADIO COMMUNICATION METHOD

TECHNICAL FIELD

The present disclosure relates to a terminal and a radio communication method in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (e.g., referred to as "5th generation mobile communication system (5G)," "5G+ (plus)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In radio communication systems in the future (for example, NR), it is studied that a user terminal (User Equipment (UE)) controls transmission/reception processing based on information relating to quasi-co-location (QCL).

In NR, it is studied that one or more transmission/reception points (TRPs) (multi-TRP) use one or more panels (multi-panel) to perform DL transmission (for example, PDSCH transmission) to a UE, and to perform UL transmission by the UE to the multi-TRP or the multi-panel.

However, in NR specifications in the past, the multi-panel/TRP has not been considered, and therefore, QCL parameters in a case that the multi-panel/TRP is used cannot be appropriately determined. If the QCL parameters cannot be appropriately determined, system performance decrease such as throughput reduction is likely to occur.

As such, an object of the present disclosure is to provide a terminal and a radio communication method capable of appropriately determining QCL parameters for the multi-panel/TRP.

Solution to Problem

A terminal according to an aspect of the present disclosure includes a receiving section that receives one piece of downlink control information (DCI) for scheduling a plurality of downlink shared channels (PDSCHs), and a control section that determines either a single TCI state or a plurality of TCI states for the plurality of PDSCHs in at least one of a first case and a second case, the first case being a case that a time offset from the DCI to the plurality of PDSCHs is shorter than a threshold, the second case being a case that a transmission configuration indication (TCI) field is not configured.

Advantageous Effects of Invention

According to an aspect of the present disclosure, QCL parameters for the multi-panel/TRP can be appropriately determined.

BRIEF DESCRIPTION OF DRAWINGS

FIGS. 2A to 2D are diagrams to show examples of a multi-TRP scenario;

FIGS. 4A and 4B are diagrams to show examples of a QCL assumption for a PDSCH DMRS port in Embodiment 2-1;

FIGS. 5A and 5B are diagrams to show examples of a QCL assumption for a PDSCH DMRS port in a variation of Embodiment 2-1;

FIGS. 6A and 6B are diagrams to show examples of a QCL assumption for a PDSCH DMRS port in Embodiment 2-2;

FIGS. 7A and 7B are diagrams to show examples of a QCL assumption for a PDSCH DMRS port in a variation of Embodiment 2-2;

Figure 1:
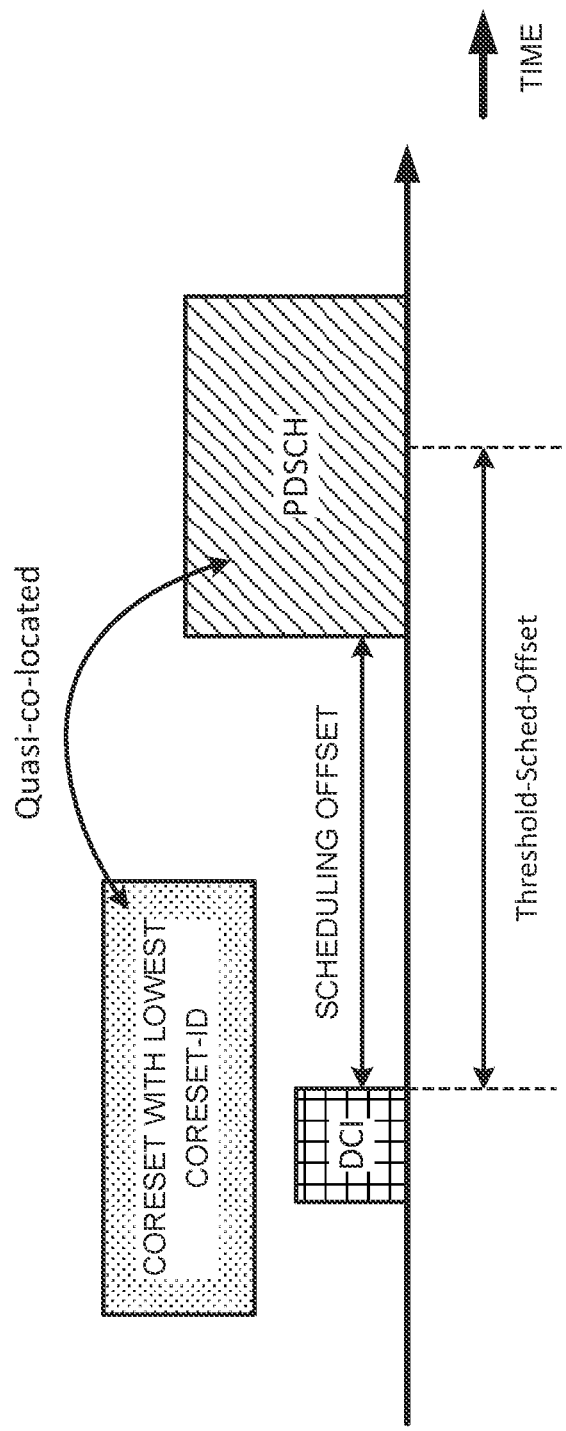
FIG. 1 is a diagram to show an example of a QCL assumption for a PDSCH DMRS port.

DESCRIPTION OF EMBODIMENTS (TCI, Spatial Relation, QCL)

In NR, a study is underway to control, based on a transmission configuration indication state (TCI state), reception processing (for example, at least one of receiving, demapping, demodulating, and decoding) and transmission processing (for example, at least one of transmitting, mapping, precoding, modulating, and coding) of at least one of a signal and a channel (referred to as a signal/channel) in the UE.

The TCI state may be a state applied to a downlink signal/channel. A state that corresponds to the TCI state applied to an uplink signal/channel may be expressed as spatial relation.

The TCI state is information relating to a quasi-co-location (QCL) of the signal/channel, and may be referred to as a spatial reception parameter, spatial relation information, and the like. The TCI state may be configured for the UE for each channel or for each signal.

QCL is an indicator indicating statistical properties of the signal/channel. For example, when a certain signal/channel and another signal/channel are in a relationship of QCL, it may be indicated that it is assumable that at least one of Doppler shift, a Doppler spread, an average delay, a delay spread, and a spatial parameter (for example, a spatial reception parameter (spatial Rx parameter)) is the same (the relationship of QCL is satisfied in at least one of these) between such a plurality of different signals/channels.

Note that the spatial reception parameter may correspond to a receive beam of the UE (for example, a receive analog beam), and the beam may be identified based on spatial QCL. The QCL (or at least one element in the relationship of QCL) in the present disclosure may be interpreted as sQCL (spatial QCL).

For the QCL, a plurality of types (QCL types) may be defined. For example, four QCL types A to D may be provided, which have different parameter(s) (or parameter set(s)) that can be assumed to be the same, and such parameter(s) (which may be referred to as QCL parameter(s)) are described below:

QCL type A (QCL-A): Doppler shift, Doppler spread, average delay, delay spread,
QCL type B (QCL-B): Doppler shift and Doppler spread,
QCL type C (QCL-C): Doppler shift and average delay,
QCL type D (QCL-D): Spatial reception parameter.

A case that the UE assumes that a certain control resource set (CORESET), channel, or reference signal is in a relationship of specific QCL (for example, QCL type D) with another CORESET, channel, or reference signal may be referred to as QCL assumption.

The UE may determine at least one of a transmit beam (Tx beam) and a receive beam (Rx beam) of the signal/channel, based on the TCI state or the QCL assumption for the signal/channel.

The TCI state may be, for example, information relating to QCL between a target channel (in other words, a reference signal (RS) for the channel) and another signal (for example, another RS). The TCI state may be configured (indicated) by higher layer signaling or physical layer signaling, or a combination of these.

Note that in the present disclosure, the higher layer signaling may be any one or a combination of Radio Resource Control (RRC) signaling, Medium Access Control (MAC) signaling, broadcast information, and the like.

The MAC signaling may use, for example, a MAC control element (MAC CE), a MAC Protocol Data Unit y(PDU), or the like. The broadcast information may be, for example, a master information block (MIB), a system information block (SIB), minimum system information (Remaining Minimum System Information (RMSI)), other system information (OSI), or the like.

The physical layer signaling may be, for example, downlink control information (DCI).

A channel configured (or indicated) with the TCI state or the spatial relation may be, for example, at least one of a downlink shared channel (Physical Downlink Shared Channel (PDSCH)), a downlink control channel (Physical Downlink Control Channel (PDCCH)), an uplink shared channel (Physical Uplink Shared Channel (PUSCH)), and an uplink control channel (Physical Uplink Control Channel (PUCCH)).

A RS in the QCL relation with the channel may be, for example, at least one of a synchronization signal block (SSB), a channel state information reference signal (CSI-RS), a measurement reference signal (Sounding Reference Signal (SRS)), a tracking CSI-RS (also referred to as a Tracking Reference Signal (TRS)), and a QCL detection reference signal (also referred to as a QRS).

The SSB is a signal block including at least one of a primary synchronization signal (PSS), a secondary synchronization signal (SSS), and a broadcast channel (Physical Broadcast Channel (PBCH)). The SSB may be referred to as an SS/PBCH block.

An information element of the TCI state ("TCI-state IE" of RRC) configured using higher layer signaling may include one or a plurality of pieces of QCL information ("QCL-Info"). the QCL information may include at least one of information relating to the RS to be in the QCL relation (RS related information) and information indicating the QCL type (QCL type information). The RS related information may include information of an index of the RS (for example, SSB index, a non-zero-power (NZP) CSI-RS resource ID (Identifier)), an index of a cell where the RS is positioned, an index of a Bandwidth Part (BWP) where the RS is positioned. and the like.

In Rel. 15 NR, as the TCI state of at least one of a PDCCH and a PDSCH, both a QCL type A RS and a QCL type D RS, or only a QCL type A RS may be configured for the UE.

In a case that a TRS is configured as the QCL type A RS, it is assumed that an identical TRS is periodically transmitted for a long time, unlike a demodulation reference signal (DMRS) for the PDCCH or the PDSCH. The UE can measure the TRS to calculate the average delay, the delay spread, and the like.

The UE configured with the TRS as the QCL type A RS in the TCI state of the DMRS for the PDCCH or the PDSCH can assume that the DMRS for the PDCCH or the PDSCH is the same as the parameter of the QCL type A of the TRS (average delay, delay spread, and the like), and thus, can find the parameter of the type A (average delay, delay spread, and the like) of the DMRS for the PDCCH or the PDSCH from a result of measuring the TRS. The UE, in channel estimation for at least one of the PDCCH and the PDSCH, can make more accurate channel estimation by using the result of measuring the TRS.

The UE configured with the QCL type D RS can determine the UE reception beam (spatial domain reception filter, UE spatial domain reception filter) by using the QCL type D RS.

A QCL type X RS in the TCI state may refer to a RS QCL-ed type X with (a DMRS of) a channel/signal, and this RS may be referred to as a QCL source for the QCL type X in the TCI state.

<TCI State for PDCCH>

The information relating to the QCL between a PDCCH (or a DMRS antenna port associated with the PDCCH) and a certain RS may be referred to as a TCI state for PDCCH.

The UE may determine a TCI state for UE-specific PDCCH (CORESET) based on higher layer signaling. For example, one or more (K) TCI states for each CORESET may be configured for the UE through RRC signaling.

In the UE, one of the plurality of TCI states configured through RRC signaling may be activated by the MAC CE for each CORESET. The MAC CE may be referred to as a TCI state indication for UE-specific PDCCH MAC CE. The UE may monitor a CORESET based on an active TCI state corresponding to the CORESET.

<TCI State for PDSCH>

The information relating to the QCL between a PDSCH (or a DMRS antenna port associated with the PDSCH) and a certain DL-RS may be referred to as a TCI state for PDSCH.

The UE may be notified of (configured with) M (M≥1) TCI states for PDSCH (QCL information for M PDSCHs) through higher layer signaling. Note that the number M of TCI states configured for the UE may be limited by at least one of UE capability and the QCL type.

The DCI used for scheduling of the PDSCH may include a certain field indicating the TCI state for the PDSCH (which may be referred to as, for example, a TCI field, a TCI state field, and the like). The DCI may be used for scheduling of the PDSCH for one cell, and may be referred to as, for example, DL DCI, DL assignment, DCI format_0, DCI format 1_1, and the like.

Whether the TCI field is included in the DCI may be controlled by information notified from a base station to the UE. The information may be information indicating whether the TCI field is present or absent in the DCI (for example, TCI present information, TCI present information in DCI, higher layer parameter TCI-PresentInDCI). For example, the above information may be configured for the UE through higher layer signaling.

In a case that more than eight TCI states are configured for the UE, up to eight TCI states may be activated (or specified) by using the MAC CE. The MAC CE may be referred to as a TCI states activation/deactivation for UE-specific PDSCH MAC CE. A value of the TCI field in the DCI may indicate one of the TCI states activated by the MAC CE.

In a case that the UE is configured with the TCI present information in which a CORESET for scheduling the PDSCH (a CORESET used for PDCCH transmission scheduling the PDSCH) is set to "enabled", the UE may assume that the TCI field is present in DCI format 1_1 of the PDCCH transmitted on the CORESET.

In a case that the TCI present information is not configured for the CORESET for scheduling the PDSCH, or the PDSCH is scheduled by DCI format 1_0, in a case that a time offset between reception of the DL DCI (DCI for scheduling the PDSCH) and reception of the PDSCH corresponding to the DCI is equal to or greater than a threshold, the UE may assume that the TCI state or QCL assumption for the PDSCH is identical to a TCI state or QCL assumption that is applied to the CORESET used for the PDCCH transmission scheduling the PDSCH for determining the PDSCH antenna port QCL.

In a case that the TCI present information is set to "enabled", in a case that the TCI field in the DCI in a component carrier (CC) scheduling (the PDSCH) indicates the activated TCI state in the scheduled CC or DL BWP, and the PDSCH is scheduled by DCI format 1_1, the UE may use the TCI according to the value of the TCI field in the detected PDCCH with the DCI for determining PDSCH antenna port QCL. In a case that the time offset between the reception of the DL DCI (scheduling the PDSCH) and the reception of the PDSCH (PDSCH scheduled by the DCI) corresponding to the DCI is equal to or greater than the threshold, the UE may assume that DM-RS ports of the PDSCH of a serving cell are QCL-ed with the RSs in the TCI state with respect to a QCL type parameter given by the indicated TCI state.

In a RRC connection mode, both in the case that the TCI information in the DCI (higher layer parameter TCI-PresentInDCI) is set to "enabled" and in the case that the TCI information in the DCI is not configured, the time offset between the reception of the DL DCI (DCI for scheduling the PDSCH) and the reception of the corresponding PDSCH (the PDSCH scheduled by the DCI) is smaller than the threshold, the UE may assume that the DM-RS ports of the PDSCH for a serving cell are QCL-ed with the RS with respect to the QCL parameter used for PDCCH QCL indication of the CORESET associated with a monitored search space with the lowest (smallest) CORESET-ID in the latest (the last) slot in which one or more CORESETs within the active BWP of the serving cell are monitored by the UE. This RS may be referred to as a default TCI state for PDSCH or a default QCL assumption for PDSCH.

The time offset between the reception of the DL DCI and the reception of the PDSCH corresponding to the DCI may be referred to as a scheduling offset.

The above threshold may be referred to as a time duration for QCL, "timeDurationForQCL", "Threshold", "Threshold for offset between a DCI indicating a TCI state and a PDSCH scheduled by the DCI", "Threshold-Sched-Offset", a schedule offset threshold, a scheduling offset threshold, and the like.

The time duration for QCL may be based on the UE capability, for example, based on a delay taken for decoding and beam switching of the PDCCH. The time duration for QCL may be a minimum time required by the UE to perform PDCCH reception and applying spatial QCL information received in the DCI for PDSCH processing. The time duration for QCL may be represented by the number of symbols for each subcarrier spacing, or by a time (e.g., µs). Information on the time duration for QCL may be reported from the UE as the UE capability information to the base station, or configured for the UE from the base station through higher layer signaling.

For example, the UE may assume that the PDSCH DMRS port is QCL-ed with the DL-RS based on the TCI state activated for the CORESET corresponding to the lowest CORESET-ID described above. The latest slot may be, for example, a slot receiving the DCI for scheduling the PDSCH described above.

Note that the CORESET-ID may be an ID (ID for identifying CORESET, controlResourceSetId) configured by way of RRC information element "ControlResourceSet".

In a case that a CORESET is not configured for the CC, the default TCI state may be an activate TCI state with the lowest ID applicable to the PDSCH in the active DL BWP of the CC.

FIG. 1 is a diagram to show an example of a QCL assumption for a PDSCH DMRS port. In this example, the scheduling offset is smaller than the scheduling offset threshold. Accordingly, the UE may assume that the PDSCH DMRS port is QCL-ed with a RS (for example, DMRS for PDCCH) in a TCI state for PDCCH corresponding to the lowest CORESET-ID in the latest slot.

In a case that the UE is configured with a single slot PDSCH, the indicated TCI state may be based on the activated TCI states in the slot with the scheduled PDSCH. In a case that the UE is configured with a multi-slot PDSCH, the indicated TCI state may be based on the activated TCI states in the first slot with the scheduled PDSCH, and the UE may expect that the activated TCI states are the same across the slots with the scheduled PDSCH.

In a case that the UE is configured with a CORESET associated with a search space set for cross carrier scheduling, the UE may be configured with the TCI present information that is set to "enabled" for the CORESET, and in a case that at least one of the TCI states configured for the serving cell scheduled by the search space set contains the QCL type D, the UE may assume that the time offset between the detected PDCCH and the PDSCH corresponding to the PDCCH is equal to or greater than the threshold.

In a case that the PDSCH and the PDCCH scheduling the PDSCH are in different component carriers (CCs) (cross carrier scheduling), if a delay from the PDCCH to the PDSCH (PDCCH-to-PDSCH delay) is shorter than time duration for QCL, or if the TCI state is not in the DCI for that scheduling, the UE may obtain the QCL assumption for the scheduled PDSCH from the active TCI state with the lowest ID applicable to the PDSCH within the active BWP of the scheduled cell.

<Spatial Relation for PUCCH>

The UE may be configured with parameters (PUCCH configuration information, PUCCH-Config) used for PUCCH transmission, through higher layer signaling (for example, Radio Resource Control (RRC) signaling). The PUCCH configuration information may be configured for each partial band (for example, uplink bandwidth part (BWP)) in a carrier (also referred to as a cell, a component carrier (CC)).

The PUCCH configuration information may include a list of PUCCH resource set information (for example, PUCCH-ResourceSet) and a list of PUCCH spatial relation information (for example, PUCCH-SpatialRelationInfo).

The PUCCH resource set information may include a list of PUCCH resource index (ID, for example, PUCCH-ResourceId) (for example, resourceList).

In a case that the UE does not have dedicated PUCCH resource configuration information (for example, dedicated PUCCH resource configuration) provided by the PUCCH resource set information in the PUCCH configuration information (before RRC setup), the UE may determine a PUCCH resource set based on parameters (for example, pucch-ResourceCommon) in system information (for example, System Information Block Type 1 (SIB 1) or Remaining Minimum System Information (RMSI). The PUCCH resource set may include 16 PUCCH resources.

On the other hand, in a case that the UE has the dedicated PUCCH resource configuration information described above (UE-dedicated uplink control channel configuration, dedicated PUCCH resource configuration) (after RRC setup), the UE may determine the PUCCH resource set in accordance with the number of UCI information bits.

The UE may determine one PUCCH resource (index) in the PUCCH resource set (for example, a cell-specifically or UE-dedicatedly determined PUCCH resource set) based on at least one of a value of a certain field (for example, PUCCH resource indication indicator field) in the downlink control information (DCI) (for example, DCI format 1_0 or 1_1 used for scheduling of the PDSCH), the number of CCEs ($N_{CCE}$) in the control resource set (CORESET) for PDCCH reception carrying the DCI, and an index ($n_{CCE, 0}$) of the head (the first) CCE of the PDCCH reception.

The PUCCH spatial relation information (for example, RRC information element "PUCCH-spatialRelationInfo") may indicate a plurality of candidate beams (spatial domain filter) for the PUCCH transmission. The PUCCH spatial relation information may indicate a spatial relation between the RS (Reference Signal) and the PUCCH.

The list of the PUCCH spatial relation information may include some elements (PUCCH spatial relation information IEs (Information Elements)). Each piece of the PUCCH spatial relation information may include, for example, at least one of an index of the PUCCH spatial relation information (ID, for example, pucch-SpatialRelationInfoId), an index of the serving cell (ID, for example, servingCellId), and information relating to a RS (reference RS) in a spatial relation with the PUCCH.

For example, the information relating to the RS may be an SSB index, a CSI-RS index (for example, NZP-CSI-RS resource configuration ID), or an SRS resource ID and an ID of the BWP. The SSB index, the CSI-RS index, and the SRS resource ID may be associated with at least one of a beam, resource, and port selected by the corresponding RS measurement.

In a case that the UE is configured with more than one piece of the spatial relation information relating to the PUCCH, the UE may control such that one piece of the PUCCH spatial relation information is active for one PUCCH resource at a certain time based on a PUCCH spatial relation activation/deactivation MAC CE.

The PUCCH spatial relation activation/deactivation MAC CE in Rel. 15 NR is expressed by three octets in total of octets (oct) 1-3 (8 bits×3=24 bits).

The MAC CE may include information on the serving cell ID ("Serving Cell ID" field), BWP ID ("BWP ID" field), PUCCH resource ID ("PUCCH Resource ID" field) and the like as application targets.

The MAC CE includes a field of "$S_i$" (i=0-7). In a case that a field of a certain $S_i$ indicated 1, the UE activates the spatial relation information indicated by spatial relation information ID #i. In a case that a field of a certain $S_i$ indicated 0, the UE deactivates the spatial relation information indicated by spatial relation information ID #i.

The UE may activate, 3 ms later after transmitting a positive acknowledgement (ACK) for a MAC CE activating certain PUCCH spatial relation information, the PUCCH relation information specified by the MAC CE.

<Spatial Relation for SRS, PUSCH>

The UE may receive information used to transmit a measurement reference signal (for example, sounding reference signal (SRS)) (SRS configuration information, for example, a parameter in the RRC control element "SRS-Config").

Specifically, the UE may receive at least one of information relating to one or more SRS resource sets (SRS resource set information, for example, RRC control element "SRS-ResourceSet") and information relating to one or more SRS resources (SRS resource information, for example, RRC control element "SRS-Resource").

One SRS resource set may be associated with the certain number of SRS resources (the certain number of SRS resources may be grouped). Each SRS resource may be identified by an SRS resource indicator (SRI) or an SRS resource ID (identifier).

The SRS resource set information may include an SRS resource set ID (SRS-ResourceSetId), a list of SRS resource ID (SRS-ResourceId) used in the resource set, an SRS resource type, and SRS usage information.

Here, the SRS resource type may indicate any one of a periodic SRS (P-SRS), a semi-persistent SRS (SP-SRS), and an aperiodic SRS (A-SRS, AP-SRS). Note that the UE may periodically (or after activation, periodically) transmit a P-SRS and an SP-SRS, and transmit an A-SRS based on an SRS request in the DCI.

The usage ("usage" of the RRC parameters, "SRS-SetUse" of L1 (Layer-1) parameters) may be, for example, beam management, codebook (CB) based transmission, noncodebook (NCB) based transmission, antenna switching, and the like. An SRS for the codebook based or noncodebook based transmission usage may be used to determine codebook based or noncodebook based PUSCH transmission precoder based on the SRI.

For example, the UE, in a case of the codebook based transmission, may determine the precoder for PUSCH transmission based on the SRI, a transmitted rank indicator (TRI), and a transmitted precoding matrix indicator (TPMI).

The UE, in a case of the noncodebook based transmission, may determine the precoder for PUSCH transmission based on the SRI.

The SRS resource information may include an SRS resource ID (SRS-ResourceId), the number of SRS ports, an SRS port number, a transmission Comb, SRS resource mapping (e.g., time and/or frequency resource positions, resource offset, resource period, the number of repetitions, the number of SRS symbols, SRS bandwidth, and the like), hopping-related information, an SRS resource type, a sequence ID, spatial relation information for an SRS, and the like.

The spatial relation information for an SRS (for example, RRC information element "spatialRelationInfo") may indicate spatial relation information between a certain reference signal and the SRS. The certain reference signal may be at least one of a synchronization signal/broadcast channel (Synchronization Signal/Physical Broadcast Channel: SS/PBCH) block, a channel state information reference signal (CSI-RS), and an SRS (for example, another SRS). The SS/PBCH block may be referred to as a synchronization signal block (SSB).

The spatial relation information for an SRS may include at least one of an SSB index, a CSI-RS resource ID, an SRS resource ID as an index of the certain reference signal described above.

Note that in the present disclosure, an SSB index, an SSB resource ID, and an SSBRI (SSB Resource Indicator) may be interchangeably interpreted. A CSI-RS index, a CSI-RS resource ID, and a CRI (CSI-RS Resource Indicator) may be interchangeably interpreted. An SRS index, an SRS resource ID, and an SRI may be interchangeably interpreted.

The spatial relation information for an SRS may include a serving cell index, a BWP index (BWP ID), and the like for the certain reference signal described above.

In NR, uplink signal transmission may be controlled based on whether beam correspondence (BC) is present or absent. The BC may be, for example, capability of a certain node (for example, the base station or the UE) to determine a beam used for signal transmission (transmit beam, Tx beam) based on a beam used for signal reception (receive beam, Rx beam).

Note that the BC may be referred to as transmit/receive beam correspondence (Tx/Rx beam correspondence), beam reciprocity, beam calibration, calibrated/non-calibrated, reciprocity calibrated/non-calibrated, degree of correspondence, degree of coincidence, and the like.

For example, in a case that the BC is present, the UE may use a beam (spatial domain transmission filter) the same as the SRS (or SRS resource) indicated from the base station based on a measurement result of one or more SRSs (or SRS resource) to transmit an uplink signal (for example, PUSCH, PUCCH, SRS, and the like).

On the other hand, in a case that the BC is absent, the UE may use a beam (spatial domain transmission filter) the same as or corresponding to a beam (spatial domain reception filter) used for a certain SSB or CSI-RS (or CSI-RS resource) to transmit an uplink signal (for example, PUSCH, PUCCH, SRS, and the like).

The UE is configured with, for a certain SRS resource, the spatial relation information relating to an SSB or CSI-RS and an SRS (for example, in the case that the BC is present), the UE may use a spatial domain filter (spatial domain transmission filter) the same as the spatial domain filter (spatial domain reception filter) for receiving the SSB or CSI-RS to transmit the SRS resource. In this case, the UE may assume that a UE receive beam for the SSB or CSI-RS is the same as a UE transmit beam for the SRS.

The UE is configured with, for a certain SRS (target SRS) resource, the spatial relation information relating to another SRS (reference SRS) and the SRS (target SRS) (for example, in the case that the BC is absent), the UE may use a spatial domain filter (spatial domain transmission filter) the same as a spatial domain filter (spatial domain transmission filter) for transmitting the reference SRS to transmit the target SRS resource. In other words, in this case, the UE may assume that a UE transmit beam for the reference SRS is the same as a UE transmit beam for the target SRS.

The UE may determine a spatial relation for a PUSCH scheduled by the DCI based on a value of a certain field (for example, SRS resource indicator (SRI) field) in the DCI (for example, DCI format 0_1). Specifically, the UE may use, for the PUSCH transmission, the spatial relation information for the SRS resource (for example, RRC information element "spatialRelationInfo") determined based on the value of the certain field (for example, SRI).

In a case of using the codebook based transmission for the PUSCH, the UE may be configured with two SRS resources thorough the RRC, where one of two SRS resources may be indicated by way of the DCI (a certain 1-bit field). In a case of using the noncodebook based transmission for the PUSCH, the UE may be configured with four SRS resources thorough the RRC, where one of four SRS resources may be indicated by way of the DCI (a certain 2-bit field). RRC reconfiguration is required for using a spatial relation other than two or four spatial relations configured through the RRC.

Note that a DL-RS can be configured for the spatial relation for the SRS resource used for the PUSCH. For example, the UE may be configured with, for an SP-SRS, the spatial relation for a plurality of (for example, up to 16) SRS resources through the RRC, where one of the plurality of SRS resources may be indicated by way of the MAC CE.

(Spatial Relation for PUSCH Scheduled by DCI Format 0_0)

DCI format 0_1 includes the SRI, but DCI format 0_0 does not include the SRI.

In Rel. 15 NR, for a PUSCH scheduled by DCI format 0_0 on a cell, the UE transmits the PUSCH according to the spatial relation if applicable, corresponding to the dedicated PUCCH resource with the lowest ID within the active UL BWP of the cell. The dedicated PUCCH resource may be a PUCCH resource UE-dedicatedly configured (configured by a higher layer parameter PUCCH-Config).

Accordingly, a PUSCH cannot be scheduled by DCI format 0_0 for a cell not configured with the PUCCH resource (for example, a secondary cell (SCell)).

In a case that PUCCH on SCell (PUCCH transmitted on the SCell) is not configured, the UCI is transmitted on the PCell. In a case that PUCCH on SCell is configured, the UCI is transmitted on the PUCCH-SCell. Therefore, the PUCCH resource and the spatial relation information is not required to be configured on all the SCells, and a cell may not be configured with a PUCCH resource.

DCI format 0_1 includes a carrier indicator field (CIF), but DCI format 0_0 does not include a CIF. Accordingly, even if the PCell is configured with a PUCCH resource, the cross carrier scheduling of a PUSCH on the SCell cannot be made by DCI format 0_0 on the PCell.

(Service (Traffic Type))

In radio communication systems in the future (for example, NR), a traffic type (also referred to as a type, service, service type, communication type, use case, and the like) is assumed such as a further improved mobile broadband (for example, enhanced Mobile Broadband (eMBB)), a machine type communication realizing massive simultaneous connections (for example, massive Machine Type Communications (mMTC), Internet of Things (IoT)), and a high reliable and low latency communication (for example, Ultra-Reliable and Low-Latency Communications (URLLC)). For example, in the URLLC, the smaller latency and the higher reliability than the eMBB are required.

The traffic type may be identified based on at least one of the following items in the physical layer.

logical channels with different priorities
Modulation and coding scheme (MCS) table (MCS index table)
Channel quality indicator (CQI) table
DCI format
Radio network temporary identifier (RNTI: System Information-Radio Network Temporary Identifier)) used to scramble (mask) cyclic redundancy check (CRC) bits included in (added to) the DCI (DCI format)
RRC (Radio Resource Control) parameters
Specific RNTI (for example, RNTI for URLLC, MCS-C-RNTI, and the like)
Search space
Certain field in the DCI (for example, newly added field, or reused of existing field)

The traffic type may be associated with communication requirements (requirements of latency, error rate, and the like, required conditions), data types (audio, data, and the like), and the like.

Differences between URLLC requirements and eMBB requirements may be that a URLLC latency is smaller than an eMBB latency, or that the URLLC requirements includes reliability requirements.

(Multi-TRP)

In NR, it is studied that one or more transmission/reception points (TRPs) (multi-TRP) use one or more panels (multi-panel) to perform DL transmission to a UE. It is studied also that the UE performs UL transmission to one or more TRPs.

Note that the plurality of TRPs may correspond to the same cell identifier (ID)), or difference cell IDs. The cell ID may be a physical cell ID, or a virtual cell ID.

FIGS. 2A to 2D are diagrams to show examples of a multi-TRP scenario. In these examples, assume that each TRP can transmit four different beams, without limitation.

FIG. 2A shows an example of a case that only one TRP (or a TRP 1 in this example) of the multi-TRP performs transmission to the UE (which may be referred to as a single mode, a single TRP, or the like). In this case, the TRP 1 transmits both a control signal (PDCCH) and a data signal (PDSCH) to the UE.

FIG. 2B shows an example of a case that only one TRP (or the TRP 1 in this example) of the multi-TRP transmits the control signal to the UE, and the multi-TRP transmit the data signals (which may be referred to as a single master mode). The UE receives each of the PDSCHs transmitted from the multi-TRP based on one piece of downlink control information (DCI).

FIG. 2C shows an example of a case that each of the multi-TRP transmits a part of the control signals to the UE, and the multi-TRP transmits the data signals (which may be referred to as a master slave mode). The TRP 1 may transmits a part 1 of the control signal (DCI), and the TRP 2 may transmits a part 2 of the control signal (DCI). The part 2 of the control signal may depend on the part 1. The UE receives each of the PDSCHs transmitted from the multi-TRP based on these parts of the DCI.

FIG. 2D shows an example of a case that each of the multi-TRP transmits a different control signal to the UE, and the multi-TRP transmits the data signals (which may be referred to as a multi-master mode). The TRP 1 may transmits a first control signal (DCI), and the TRP 2 may transmits a second control signal (DCI). The UE receives each of the PDSCHs transmitted from the multi-TRP based on these pieces of DCI.

In the case, as shown in FIG. 2B, that a plurality of PDSCHs (which may be referred to as multi-PDSCH (multiple PDSCH)) from the multi-TRP are scheduled using one piece of DCI, that DCI may be referred to as single DCI (single PDCCH). In the case, as shown in FIG. 2D, that a plurality of PDSCHs from the multi-TRP are scheduled using a plurality of pieces of DCI, the plurality of these pieces of DCI may be referred to as multi-DCI (multi-PDCCH (multiple PDCCH)).

Codewords (CW) different from each other and layers different from each other may be transmitted from the respective TRPs of the multi-TRP. As one form of multi-TRP transmission, non-coherent joint transmission (NCJT) is under study.

In the NCJT, for example, the TRP 1 modulates and maps a first codeword, and transmits a first PDSCH using a first precoding of a first number of layers (for example, two layers) by layer mapping. The TRP 2 modulates and maps a second codeword, and transmits a second PDSCH using a second precoding of a second number of layers (for example, two layers) by layer mapping.

Note that the plurality of PDSCHs (multi-PDSCH) subjected to the NCJT may be defined to overlap partially or fully in at least one of time and frequency domains. In other words, the first PDSCH from a first TRP and the second PDSCH from a second TRP may overlap in at least one of time and frequency resources.

These first and second PDSCHs may be assumed to be not in a quasi-co-location (QCL) relation (or to be not quasi-co-located). The reception of the multi-PDSCH may be interpreted as simultaneous reception of PDSCHs of not a certain QCL type (for example, QCL type D).

In the URLLC for the multi-TRP, a study is underway to support PDSCH repetition across the multi-TRP (transport block (TB) or codeword (CW)). A study is underway to support a repetition scheme (URLLC scheme, for example, scheme 1, 2a, 2b, 3, or 4) across the multi-TRP on the frequency domain or the layer (spatial) domain or the time domain. In the scheme 1, the multi-PDSCH from the multi-TRP is space division multiplexed (SDMed). In the schemes 2a and 2b, the PDSCHs from the multi-TRP are frequency division multiplexed (FDMed). In the scheme 2a, the redundancy version (RV) is applied to the multi-TRP. In the scheme 2b, the same or different RV may be applied to the multi-TRP. In the schemes 3 and 4, the multi-PDSCH from the multi-TRP is time division multiplexed (TDMed). In the scheme 3, the multi-PDSCH from the multi-TRP is transmitted in one slot. In the scheme 4, the multi-PDSCH from the multi-TRP is transmitted in the different slots.

According to such a multi-TRP scenario, more flexible transmission control using a good quality channel is possible.

However, in NR specifications in the past, the multi-panel/TRP has not been considered, and therefore, QCL assumption in a case that the multi-panel/TRP is used cannot be appropriately controlled.

Studies have not yet advanced on how to assume the QCL for the multi-PDSCH respectively transmitted from the multi-TRP. In a case of complying with the current NR specification, a space diversity gain, high rank transmission, and the like in the case of using the multi-panel/TRP cannot be preferably realized so that communication throughput increase may be suppressed.

As such, the inventors of the present invention came up with a method for determining the QCL parameters from a plurality of points.

Hereinafter, embodiments according to the present disclosure will be described in detail with reference to the drawings. The radio communication method according to each embodiment may be employed independently or may be employed in combination.

Note that, in the present embodiment, a panel, an Uplink (UL) transmission entity, a TRP, a spatial relation, a control resource set (CORESET), a PDSCH, a codeword, a base station, a certain antenna port (for example, a demodulation reference signal (DMRS) port), a certain antenna port group (for example, a DMRS port group), a certain group (for example, code division multiplexing (CDM) group, a certain reference signal group, a CORESET group), a CORESET pool, and the like may be interchangeably interpreted. A panel Identifier (ID) and a panel may be interchangeably interpreted. A TRP ID and a TRP may be interchangeably interpreted.

In the present disclosure, NCJT, NCJT using multi-TRP, multi-PDSCH using NCJT, multi-PDSCH, a plurality of PDSCHs from multi-TRP and the like may be interchangeably interpreted. Note that the multi-PDSCH may mean a plurality of PDSCHs with at least some of the time resources (for example, one symbol) overlapping, a plurality of PDSCHs with the whole time resources (for example, all symbols) overlapping, a plurality of PDSCHs with none of the time resources overlapping, a plurality of PDSCHs carrying the same TB or the same CW, and a plurality of PDSCHs to which different UE beams (spatial domain reception filter, QCL parameters) are applied.

In the present disclosure, the default TCI state may be interpreted as a default QCL, a default QCL assumption, and the like. Hereinafter, this TCI state or QCL (QCL assumption) is expressed as the default TCI state, but the designation there of is not limited to this.

Note that the definition of the default TCI is not limited to this. The default TCI state may be, for example, a TCI state assumed in a case that a TCI state/QCL specified by way of the DCI cannot be used for a certain channel/signal (for example, PDSCH), or a TCI state assumed in a case that a TCI state/QCL is not specified (or configured).

In the present disclosure, a cell, a CC, a carrier, a BWP, and a band may be interchangeably interpreted.

In the present disclosure, an index, an ID, an indicator, and a resource ID may be interchangeably interpreted.

In the present disclosure, a specific UL transmission, a specific UL signal, a specific type of UL transmission, a specific UL channel, a PUSCH, a PUCCH, an SRS, a P-SRS, an SP-SRS, and an A-SRS may be interchangeably interpreted. In the present disclosure, a specific DL signal, a specific DL resource, a specific type of DL transmission, a specific DL transmission, a specific DL reception, a specific DL channel, a PDSCH, a PDCCH, a CORESET, a DL-RS, an SSB, and a CSI-RS may be interchangeably interpreted.

A TCI state, a TCI state or QCL assumption, a QCL assumption, a QCL parameter, a spatial domain reception filter, a UE spatial domain reception filter, a spatial domain filter, a UE receive beam, a DL receive beam, a DL precoding, a DL precoder, a DL-RS, a QCL type D RS in a TCI state or QCL assumption, and a QCL type A RS in a TCI state or QCL assumption may be interchangeably interpreted. A QCL type D RS, a DL-RS associated with QCL type D, a DL-RS with QCL type D, a DL-RS resource, an SSB, and a CSI-RS may be interchangeably interpreted.

In the present disclosure, the TCI state may be information relating to a receive beam (spatial domain reception filter) indicated (configured) for the UE (for example, a DL-RS, a QCL type, a cell to which a DL-RS is transmitted, or the like). The QCL assumption may be information relating to a receive beam (spatial domain reception filter) assumed by the UE based on transmission or reception of an associated signal (for example, PRACH) (for example, a DL-RS, a QCL type, a cell to which a DL-RS is transmitted, or the like).

In the present disclosure, the latest slot, the most recent slot, the latest search space, and the most recent search space may be interchangeably interpreted.

In the present disclosure, a spatial relation, spatial relation information, a spatial relation assumption, a QCL parameter, a spatial domain transmission filter, UE spatial domain transmission filter, a spatial domain filter, a UE transmit beam, a UL transmission beam, a UL precoding, a UL precoder, a spatial relation RS, a DL-RS, a QCL assumption, an SRI, a spatial relation based on an SRI, and UL TCI may be interchangeably interpreted.

In the present disclosure, a default spatial relation, a default spatial relation assumption, a QCL RS for a specific DL resource, a TCI state or QCL assumption for a specific DL resource, a TCI state or QCL assumption for a specific DL signal, a RS with respect to a QCL parameter given by a TCI state or QCL assumption for a specific DL signal, a QCL type D RS in a TCI state or QCL assumption for a specific DL signal, and a spatial relation for reference UL transmission may be interchangeably interpreted.

In the present disclosure, "the UE transmits the specific UL transmission according to the default spatial relation", "the UE uses the default spatial relation for the spatial relation for the specific UL transmission", "the UE assumes (considers) that the spatial relation for the specific UL transmission is the same as the default spatial relation RS", and "the UE assumes (considers) that the spatial relation for the specific UL transmission is the same as the QCL type D RS for the default spatial relation" may be interchangeably interpreted.

In the present disclosure, a TRS, a tracking CSI-RS, a CSI-RS with TRS information (higher layer parameter trs-Info), and an NZP-CSI-RS resource in an NZP-CSI-RS resource set with TRS information may be interchangeably interpreted.

In the present disclosure, DCI format 0_0, DCI not including an SRI, DCI not including a spatial relation indication, and DCI not including a CIF may be interchangeably interpreted. In the present disclosure, DCI format 0_1, DCI including an SRI, DCI including a spatial relation indication, and DCI including a CIF may be interchangeably interpreted.

In the present disclosure, a pathloss reference RS, a RS for pathloss reference, a RS for pathloss estimation, a RS pathloss calculation, a pathloss (PL)-RS, an index $q_d$, a RS used for pathloss calculation, a RS resource used for pathloss calculation, and a calculation RS may be interchangeably interpreted. Calculation, estimation, and measurement may be interchangeably interpreted.

(Radio Communication Method)

In the present disclosure, the UE performing a single TRP operation, the UE assuming a single TRP operation, the UE performing a PDSCH reception from a single TRP, the UE using (determining) a single default TCI state (default QCL assumption), the UE using (determining) a single default spatial relation, and the UE assuming a specific UL transmission to a single TRP may be interchangeably interpreted. In the present disclosure, the UE performing a multi-TRP operation, the UE assuming a multi-TRP operation, the UE assuming a PDSCH reception from multi-TRP, the UE using (determining) a plurality of default TCI states (default QCL assumption), the UE using (determining) a plurality of default spatial relations, and the UE performing a specific UL transmission to multi-TRP may be interchangeably interpreted.

Embodiment 1

In a case (single DCI (single PDCCH)) that the multi-PDSCH from the multi-TRP is scheduled by one piece of DCI from one TRP, the UE may determine at least one TCI state.

A codepoint of the TCI field in the DCI (TCI codepoint, value) may be associated with one or two TCI states (TCI state IDs). This association may be notified to the UE through at least one of higher layer signaling (RC signaling) and the MAC CE. In a case that one TCI codepoint is associated with two TCI state IDs, the first TCI state ID may correspond to the first TRP and the second TCI state ID may correspond to the second TRP.

The UE may determine (switch) any of the single TRP operation and the multi-TRP operation based on at least one of whether or not the UE is configured with the TCI present information (higher layer parameter tci-PresentInDCI) that is set to enabled for the CORESET for scheduling the PDSCH, and whether or not the scheduling offset (time offset) between the reception of the DL DCI and the corresponding PDSCH is equal to or greater than the scheduling offset threshold (timeDurationForQCL).

<<Case 1>>

Here, Case 1 is described that the TCI present information is configured, and the scheduling offset is equal to or greater than the scheduling offset threshold.

In a case that the UE is configured with the TCI present information (higher layer parameter tci-PresentInDCI) that is set to enabled for the CORESET for scheduling the PDSCH, and the scheduling offset between the reception of the DL DCI and the corresponding PDSCH is equal to or greater than the scheduling offset threshold (timeDurationForQCL), the UE may determine (switch) any one of the single TRP operation and the multi-TRP operation based on the number of TCI states indicated by the DCI.

For example, in a case that one TCI state is indicated by the DCI, the UE may perform the single TRP operation. For example, in a case that two TCI states indicated by the DCI, the UE may perform the multi-TRP operation.

<<Case 2>>

Here, Case 2 is described that the TCI present information is configured, and the scheduling offset is smaller than the scheduling offset threshold.

In a case that the UE is configured with the TCI present information (higher layer parameter tci-PresentInDCI) that is set to enabled for the CORESET for scheduling the PDSCH, and the scheduling offset between the reception of the DL DCI and the corresponding PDSCH is smaller than the scheduling offset threshold (timeDurationForQCL), the UE may determine the single TRP operation or the multi-TRP operation according to an operation determination method of any of the following options 1 to 4.

[Option 1]

Similar to in Rel. 15, the UE always may perform the single TRP operation. The UE may always use a single default TCI state for the PDSCH. According to this, the UE can fall back to the single TRP operation.

[Option 2]

The UE may always perform the multi-TRP operation. The UE may always use a plurality of default TCI states for the PDSCH.

[Option 3]

The UE based on the MAC CE (activation command) may perform switching (dynamic switching) between the single TRP operation and the multi-TRP operation.

Any of the single TRP operation and the multi-TRP operation may be determined based on the number of TCI states corresponding to a specific TCI codepoint in the TCI codepoints configured or activated through at least one of RRC signaling and the MAC CE.

After the UE receives an initial configuration of the TCI state through higher layer signaling, and before the UE receives the activation command, the UE performs the single TRP operation similar to in Rel. 15. After the UE receives the activation command, the UE may determine any of the single TRP operation and the multi-TRP operation based on the number of TCI states corresponding to a specific TCI codepoint in the activated TCI codepoints.

The activation command may indicate one or two TCI state IDs corresponding to each of one or more TCI codepoints.

For example, in a case that the specific TCI codepoint corresponds to one TCI state, the UE may perform the single TRP operation. For example, in a case that the specific TCI codepoint corresponds to corresponds to two TCI states, the UE may perform the multi-TRP operation.

The specific TCI codepoint may be the smallest or largest TCI codepoint. For example, in a case that the TCI field has three bits, the smallest TCI codepoint is 000 and the largest TCI codepoint is 111. The default TCI state of the specific TCI codepoint can be specified for the UE by way of the MAC CE.

The specific TCI codepoint may be the smallest or largest TCI codepoint in the TCI codepoints corresponding to one or two TCI state IDs including the default TCI state (default TCI state in Rel. 15).

The specific TCI codepoint may be a TCI codepoint corresponding to one or two TCI state IDs including the smallest or largest TCI state ID.

[Option 4]

The UE may perform switching (semi-static switching) between the single TRP operation and the multi-TRP operation based on the higher layer (RRC) configuration.

[Option 4-1]

The UE may be configured with the single TRP operation or the multi-TRP operation by a new higher layer parameter. The new higher layer parameter may be a higher layer parameter not defined in Rel. 15.

[Option 4-2]

The UE may be configured with the single TRP operation or the multi-TRP operation by the existing higher layer parameter. The existing higher layer parameter may be a higher layer parameter defined in Rel. 15. The existing higher layer parameter may be a higher layer parameter for RS configuration.

The existing higher layer parameter may be a phase tracking (PT)-RS port configuration. In a case the one PT-RS port is configured, the UE performs the single TRP operation. In a case that two PT-RS ports are configured, the UE performs the multi-TRP operation.

The existing higher layer parameter may be a cell-specific reference signal (CRS) pattern configuration. In a case that one CRS pattern is configured, the UE performs the single TRP operation. In a case that more than one CRS pattern is configured, the UE performs the multi-TRP operation.

<<Case 3>>

Here, Case 3 is described that the TCI present information is not configured.

In the case that the UE is not configured with the TCI present information (higher layer parameter tci-PresentInDCI) for the CORESET for scheduling the PDSCH, the UE may determine the single TRP operation or the multi-TRP operation according to the operation determination method of any of Options 1, 2, and 4 in Case 2.

«Default TCI State Determination Method»

The UE may determine the default TCI states of one or both of the multi-PDSCH scheduled by using the single PDCCH based on at least one of the following items.

(1) A rule the same as in Rel. 15 NR (QCL assumption for the CORESET associated with the lowest CORESET-ID in the latest slot), (2) The QCL assumption for the single PDCCH describe above, (3) The TCI state of the TCI state ID for the corresponding panel in the TCI states corresponding to the TCI codepoint specified by the TCI field in the single PDCCH described above (in other words, the TCI state of the corresponding panel indicated by the TCI field), (4) The TCI state corresponding to the specific TCI codepoint that may be specified by the TCI field in the single PDCCH described above, (5) The TCI state of the specific TCI state ID for the corresponding panel in all TCI states corresponding to the codepoints that may be specified by the TCI field in the single PDCCH described above.

Note that in the present disclosure, "specific", "the lowest", "the highest", "the M-th in ascending order" (M is an integer), and "the M-th in a descending order" may be interchangeably interpreted. The "TCI codepoint" may be interpreted as the "codepoint of the TCI field", the "value of the TCI field", and the like.

In a case of (1) above, the UE may determine that the default TCI states of one or both of the multi-PDSCH scheduled by using the single PDCCH are the QCL assumptions for the CORESET associated with the lowest CORESET-ID in the latest slot in which one or more CORESETs within an active BWP of a serving cell are configured for the UE.

In a case of (2) above, the UE may assume that the default TCI states of one or both of the multi-PDSCH scheduled by using the single PDCCH are QCL-ed with the RS (for example, PDCCH DMRS) in the TCI state for PDCCH corresponding to the single PDCCH.

In a case of (3) above, the TCI states applied to one or both of the multi-PDSCH can be identical in the cases where the scheduling offset is equal to or greater than the scheduling offset threshold and where the scheduling offset is smaller than the scheduling offset threshold.

In a case of (4) above, the "specific TCI codepoint" may be, for example, the lowest TCI codepoint in the TCI codepoints indicating an arbitrary number of TCI states (that is, in all the TCI codepoints) (4-1), or the lowest TCI codepoint in the TCI codepoints indicating two TCI states (4-2).

Note that the X-th (X is 1 or larger) codepoint may be interpreted as the X-th TCI state activated by the MAC CE (for example, the TCI state activation/deactivation MAC CE for UE-specific PDSCH) for the PDSCH (or multi-PDSCH), or the X-th TCI state for the PDSCH configured through RRC signaling.

All of the TCI states corresponding to the codepoints that may be specified in (5) above may mean all of the TCI states activated by the MAC CE, or may be interpreted as all of the TCI states for the PDSCH configured through RRC signaling.

Note that the TCI state may be activated or configured in association with a cell/BWP.

In a case that the PDSCHs of multiple TRPs are scheduled by one PDCCH (that is, the multi-PDSCH is scheduled using the single PDCCH), a case (also referred to as Case 1) that the UE assumes each of the default TCI states for the multi-PDSCH based on the same source QCL or the same rule may be used, or a case (also referred to as Case 2) that the UE assumes each of the default TCI states for the multi-PDSCH based on different source QCLs or different rules may be used.

If Case 1 is adopted, the rules can be unified, and therefore, increase in the load on the UE can be expected to be suppressed. If Case 2 is adopted, the QCL assumptions for the different TRPs can be individually determined, and therefore, performance improvement is expected. Note that information relating to whether Case 1 or 2 is used, or which rule (for example, (1) to (5) above) the UE determines the default TCI state based on, and the like may be determined based on higher layer signaling, or the UE capability.

An example is described in which the above item (4-1) is applied to both of the multi-PDSCH. The UE may assume that the default TCI states for the multi-PDSCH are the TCI states corresponding to the lowest TCI codepoint (for example, TCI field="000") (or the first TCI state activated by the MAC CE).

Here, in a case that the TCI state corresponding to the lowest TCI codepoint is one TCI state (for one panel), the UE may assume that single TRP transmission is adopted by the single PDCCH. In other words, in the case that the TCI state corresponding to the lowest TCI codepoint is one TCI state, even in a case that reception of the multi-PDSCH is scheduled by the single PDCCH, the UE may receive only one of the multi-PDSCH based on that one TCI state.

Note that the number of TCI states corresponding to a TCI codepoint is two (for two panels), the UE may assume that one of that one TCI state (for example, the first TCI state) is applied to the first TRP (one of the multi-PDSCH) and the other (for example, the second TCI state) is applied to the second TRP (the other of the multi-PDSCH).

Figures 3A, 3B:
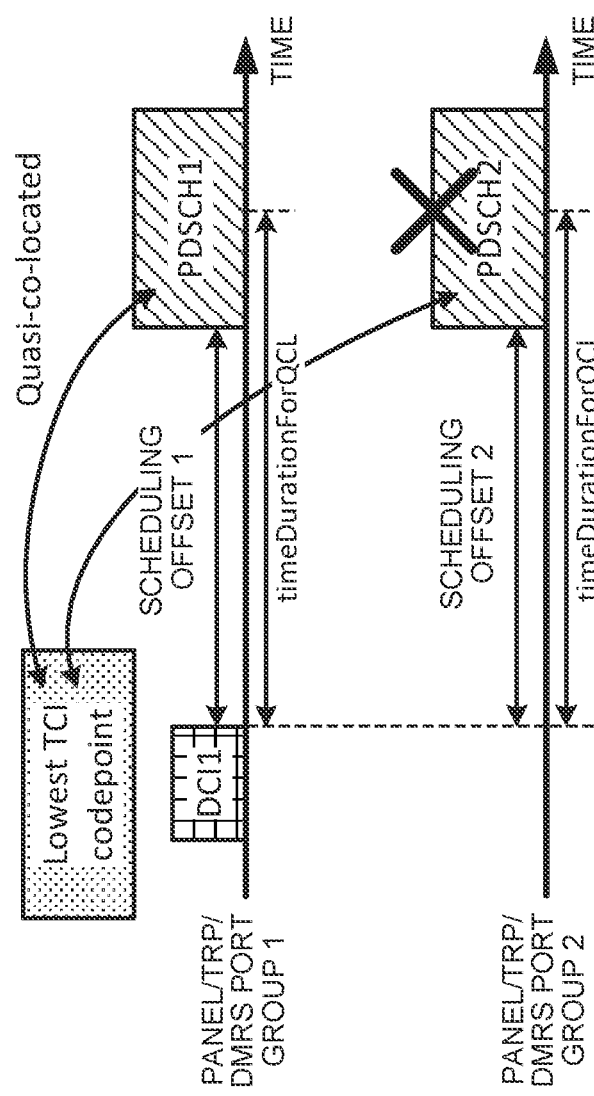
FIGS. 3A and 3B are diagrams to show examples of a case that the lowest TCI codepoint is applied to default TCI states for multi-PDSCH.

FIGS. 3A and 3B are diagrams to show examples of a case that the lowest TCI codepoint is applied to the default TCI states for the multi-PDSCH. This example corresponds to the example of the single PDCCH shown in FIG. 2B.

The UE receives DCI 1 and a PDSCH 1 transmitted from a panel 1 (or a TRP 1 or a DMRS port group 1). The UE receives a PDSCH 2 transmitted from a panel 2 (or a TRP 2 or a DMRS port group 2).

The DCI 1 schedules the receptions of the PDSCH 1 and the PDSCH 2. A scheduling offset 1 from the reception of the DCI 1 to the PDSCH 1 is smaller than the scheduling offset threshold. A scheduling offset 2 from the reception of the DCI 1 to the PDSCH 2 is smaller than the scheduling offset threshold.

FIG. 3B shows an example of a correspondence relation between the TCI codepoint and the TCI state in the TCI field of the DCI 1 assumed in the example in FIG. 3A. The specific TCI codepoint (the lowest TCI codepoint) is "000", and the corresponding TCI state is one TCI state with TCI state ID=T2. Note that TCI state ID=TX (X is an integer) may be interpreted as TCI state ID=X. "TCI state ID=TX" may be interpreted as "TCI state with TCI state ID=TX".

In FIG. 3A, both the scheduling offsets 1 and 2 are smaller than the scheduling offset threshold. On the other hand, because the TCI state corresponding to the lowest TCI codepoint is one TCI state, the UE may assume that the default TCI state for the PDSCH 1 in FIG. 3A is TCI state ID=T2, and that the PDSCH 2 is not transmitted (or the UE does not receive the PDSCH 2, the UE skips the PDSCH 2, or the PDSCH 2 is muted).

Note that in the case that the number of the TCI states is one, the UE may assume that the default TCI state, for the multi-PDSCH, with the smaller (or larger) panel ID is the TCI state.

Note that the DCI 1 may be transmitted in the CORESET with the lowest CORESET-ID in the panel 1, or in another CORESET (similarly in the figures described below, even in the case that the CORESET and the DCI are described, the DCI may be or may not be included in the CORESET).

<<Variations>>

The operation determination method in Case 2 (any of Options 1 to 4) may be different from the operation determination method in Case 3 (any of Options 1, 2, and 4).

The UE may use the operation determination method of Option 3 in Case 2, and the operation determination method of Option 1 in Case 3. In the operation determination method of Option 3 in Case 2, the specific TCI codepoint may be the smallest or largest TCI codepoint. In this case, the UE can perform the stable communication.

The operation determination methods in at least one of Case 2 and Case 3 may be different in the traffic type. For example, the operation determination methods in the eMBB may be different from the operation determination methods in the URLLC.

The operation determination methods in at least one of Case 2 and Case 3 may be the same regardless of the traffic type, or may be the same regardless of a multi-PDSCH scheme from the multi-TRP. For example, the same operation determination methods may be applied to the eMBB and the URLLC. For example, in Case 2 or Case 3, the same operation determination methods may be applied to eMBB, URLLC scheme 1a, URLLC scheme 2a, URLLC scheme 2b, URLLC scheme 3, and URLLC scheme 4.

The operation determination methods in at least one of Case 2 and Case 3 may be different in the traffic type, or may be different depending on the multi-PDSCH scheme from the multi-TRP. For example, the different operation determination methods may be applied to the eMBB and the URLLC. For example, in Case 2 or Case 3, the different operation determination methods may be applied to at least two of eMBB, URLLC scheme 1a, URLLC scheme 2a, URLLC scheme 2b, URLLC scheme 3, and URLLC scheme 4.

The multi-TRP operation is not always optimal, and thus, falling back to the single TRP operation is preferably possible. The operation in Cases 1 to 3 described above may be applied to multi-TRP URLLC scheme based on the single DCI. For example, in Case 1, any of the single TRP operation and the multi-TRP operation may be determined based on the number of TCI states in the TCI codepoint indicated by the DCI. For example, for multi-TRP URLLC scheme based on the single DCI, in Cases 2 and 3, any of the single TRP operation and the multi-TRP operation may be determined based on the number of TCI states in the specific TCI codepoint in the TCI codepoints activated by the MAC CE.

According to this embodiment, the UE can appropriately determine one or more default TCI states for the multi-TRP and the single DCI.

Embodiment 2

In a case (multi-DCI (multi-PDCCH)) that the multi-PDSCH from the multi-TRP is scheduled by the multi-DCI from the multi-TRP, the UE may determine at least one TCI state.

Embodiment 2-1

In Embodiment 2-1, in the case that the time offset (scheduling offset) between the reception of the DL DCI and the reception of the PDSCH corresponding to the DCI is smaller than the scheduling offset threshold, the UE may assume that the PDSCH DMRS ports for a serving cell are QCL-ed with the RS in the TCI state with respect to the QCL parameter used for the PDCCH QCL indication of the lowest CORESET-ID of a specific associated panel ID in the latest slot in which one or more CORESETs within the active BWP of the serving cell are configured for the UE.

Here, the specific associated panel ID may be, for example, the lowest or highest panel ID in the latest slot in which one or more CORESETs within the active BWP of the serving cell are configured for the UE.

FIGS. 4A and 4B are diagrams to show examples of a QCL assumption for a PDSCH DMRS port in Embodiment 2-1. The example in FIG. 4A, differing from FIG. 3A, is the multi-PDCCH, in which the DCI 1 schedules the PDSCH 1 and the DCI 2 schedules the PDSCH 2. Both the scheduling offset 1 between the DCI 1 and the PDSCH 1 and the scheduling offset 2 between the DCI 1 and the PDSCH 1 are smaller than the scheduling offset threshold. The example in FIG. 4B differs from the example in FIG. 4A in that the scheduling offsets 1 is equal to or greater than the scheduling offset threshold. Note that in these examples, assume that the above specific associated panel ID is a panel ID 1, without limitation.

In FIG. 4A, both the scheduling offsets 1 and 2 are smaller than the scheduling offset threshold. Accordingly, the UE may assume that both the DMRS port for the PDSCH 1 and the DMRS port for the PDSCH 2 are QCL-ed with the RS in the TCI state for PDCCH corresponding to the lowest CORESET-ID of the panel 1 in the latest slot.

Note that the DCI 1 may be transmitted in the CORESET with the lowest CORESET-ID in the panel 1, or in another CORESET (similarly in the figures described below, even in the case that the CORESET and the DCI are described, the DCI may be or may not be included in the CORESET).

In FIG. 4B, the scheduling offset 1 is greater than the scheduling offset threshold, and the scheduling offset 2 is smaller than the scheduling offset threshold. Accordingly, the UE may assume that the DMRS port for the PDSCH 1 is QCL-ed with the RS in the TCI state with respect to the QCL type parameter given by the TCI state indicated by the DCI 1. The UE may assume that the PDSCH DMRS port for the PDSCH 2 is QCL-ed with a RS in the TCI state for PDCCH corresponding to the lowest CORESET-ID of the panel 1 in the latest slot.

Note that as a variation of Embodiment 2-1, in the case that the scheduling offset is smaller than the scheduling offset threshold, the UE may assume that the PDSCH DMRS ports for a serving cell are QCL-ed with the RS in the TCI state with respect to the QCL parameter used for the PDCCH scheduling a PDSCH of the specific associated panel ID in the latest slot in which one or more CORESETs within the active BWP of the serving cell are configured for the UE.

FIGS. 5A and 5B are diagrams to show examples of a QCL assumption for a PDSCH DMRS port in the variation of Embodiment 2-1. FIGS. 5A and 5B are similar to FIGS. 4A and 4B, respectively, except for the QCL assumption.

In FIG. 5A, both the scheduling offsets 1 and 2 are smaller than the scheduling offset threshold. Accordingly, the UE may assume that both the DMRS port for the PDSCH 1 and the DMRS port for the PDSCH 2 are QCL-ed with the RS in the TCI state for PDCCH corresponding to the DCI (that is the DCI 1) scheduling the PDSCH (that is the PDSCH 1) of the panel 1 in the latest slot.

In FIG. 5B, the scheduling offset 1 is greater than the scheduling offset threshold, and the scheduling offset 2 is smaller than the scheduling offset threshold. Accordingly, the UE may assume that the DMRS port for the PDSCH 1 is QCL-ed with the RS in the TCI state with respect to the QCL type parameter given by the TCI state indicated by the DCI 1. The UE may assume that the DMRS port for the PDSCH 2 is QCL-ed with the RS in the TCI state for PDCCH corresponding to the DCI (that is the DCI 1) scheduling the PDSCH (that is the PDSCH 1) of the panel 1 in the latest slot.

According to Embodiment 2-1 described above, the QCL assumption for the PDSCH in the case that the scheduling offset is smaller than the scheduling offset threshold can be determined based on the specific panel. If the scheduling offset is made smaller than the scheduling offset threshold, the QCL assumptions for a plurality of PDSCHs can be identical.

Embodiment 2-2

In Embodiment 2-2, in the case that the time offset (scheduling offset) between the reception of the DL DCI and the reception of the PDSCH corresponding to the DCI is smaller than the scheduling offset threshold, the UE may assume that the PDSCH DMRS ports for a serving cell are QCL-ed with the RS in the TCI state with respect to the QCL parameter used for the PDCCH QCL indication of the lowest CORESET-ID of a corresponding associated panel ID in the latest slot in which one or more CORESETs within the active BWP of the serving cell are configured for the UE.

Here, the corresponding associated panel ID may be, for example, a panel ID used to transmit or receive the above PDSCH (or DCI).

FIGS. 6A and 6B are diagrams to show examples of a QCL assumption for a PDSCH DMRS port in Embodiment 2-2. FIGS. 6A and 6B are similar to FIGS. 4A and 4B, respectively, except for the QCL assumption.

In FIG. 6A, both the scheduling offsets 1 and 2 are smaller than the scheduling offset threshold. Accordingly, the UE may assume that the PDSCH DMRS port for the PDSCH 1 is QCL-ed with the RS in the TCI state for PDCCH corresponding to the lowest CORESET-ID of the panel 1 (the panel for the PDSCH 1) in the latest slot. The UE may assume that the PDSCH DMRS port for the PDSCH 2 is QCL-ed with the RS in the TCI state for PDCCH corresponding to the lowest CORESET-ID of the panel 2 (the panel for the PDSCH 2) in the latest slot.

In FIG. 6B, the scheduling offset 1 is greater than the scheduling offset threshold, and the scheduling offset 2 is smaller than the scheduling offset threshold. Accordingly, the UE may assume that the DMRS port for the PDSCH 1 is QCL-ed with the RS in the TCI state with respect to the QCL type parameter given by the TCI state indicated by the DCI 1. The UE may assume that the PDSCH DMRS port for the PDSCH 2 is QCL-ed with the RS in the TCI state for PDCCH corresponding to the lowest CORESET-ID of the panel 2 (the panel for the PDSCH 2) in the latest slot.

Note that as a variation of Embodiment 2-2, the UE may assume that the PDSCH DMRS ports for a serving cell are QCL-ed with the RS in the TCI state with respect to the QCL parameter used for the PDCCH scheduling a PDSCH of the specific associated panel ID in the latest slot in which one or more CORESETs within the active BWP of the serving cell are configured for the UE.

FIGS. 7A and 7B are diagrams to show examples of a QCL assumption for a PDSCH DMRS port in the variation of Embodiment 2-2. FIGS. 7A and 7B are similar to FIGS. 4A and 4B, respectively, except for the QCL assumption.

In FIG. 7A, both the scheduling offsets 1 and 2 are smaller than the scheduling offset threshold. Accordingly, the UE may assume that the DMRS port for the PDSCH 1 is QCL-ed with the RS in the TCI state for PDCCH corresponding to the DCI (that is the DCI 1) scheduling the PDSCH (that is the PDSCH 1) of the panel 1 in the latest slot. The UE may assume that the DMRS port for the PDSCH 2 is QCL-ed with the RS in the TCI state for PDCCH corresponding to the DCI (that is the DCI 2) scheduling the PDSCH (that is the PDSCH 2) of the panel 2 in the latest slot.

In FIG. 7B, the scheduling offset 1 is greater than the scheduling offset threshold, and the scheduling offset 2 is smaller than the scheduling offset threshold. Accordingly, the UE may assume that the DMRS port for the PDSCH 1 is QCL-ed with the RS in the TCI state with respect to the QCL type parameter given by the TCI state indicated by the DCI 1. The UE may assume that the DMRS port for the PDSCH 2 is QCL-ed with the RS in the TCI state for PDCCH corresponding to the DCI (that is the DCI 2) scheduling the PDSCH (that is the PDSCH 2) of the panel 2 in the latest slot.

According to Embodiment 2-2 described above, the QCL assumption for the PDSCH in the case that the scheduling offset is smaller than the scheduling offset threshold can be determined based on the corresponding panel.

Embodiment 2-3

Embodiment 2-1 may be adopted in a case that, for example, at least one of the following conditions is met:
- A case that the UE receives a plurality of PDCCHs (DCI) or PDSCHs from one TRP,
- A case that the UE receives a plurality of PDCCHs (DCI) or PDSCHs from the multi-panel,
- A case that the TCI state in the DCI between the multi-TRP or between the multi-panel is assumed as the QCL type D.

Embodiment 2-2 may be adopted in a case that, for example, at least one of the following conditions is met:
- A case that the UE receives a plurality of PDCCHs (DCI) or PDSCHs from the multi-TRP, A case that the UE receives a plurality of PDCCHs (DCI) or PDSCHs from the multi-panel, A case that the TCI state in the DCI between the multi-TRP or between the multi-panel is not assumed as the QCL type D.

Note that in these conditions, the TCI state in the DCI may be interpreted as at least one of the activated TCI state, the lowest TCI state ID, the TCI state with the lowest CORESET ID, and the like.

The determination methods for the QCL assumption in Embodiment 2-1 and Embodiment 2-2 may be differently used depending on the condition.

FIG. 4A to FIG. 7B show the examples of the multi-PDCCH, but the respective embodiments of the present disclosure may be applied to the single PDCCH. In this case, the DCI 1 and the DCI 2 may be interpreted as the same one piece of DCI.

For example, in FIG. 4A, in a case that the DCI 1 is not present, and the DCI 2 schedules the PDSCH 1 and the PDSCH 2, the UE may assume that both the DMRS port for the PDSCH 1 and the DMRS port for the PDSCH 2 are QCL-ed with the RS in the TCI state for PDCCH corresponding to the lowest CORESET-ID of the panel 1 in the latest slot.

Note in the respective embodiments of the present disclosure, the examples are shown in which reception timings of the DCI 1 and the DCI 2 are the same, without limitation. The respective embodiments of the present disclosure may be applicable even in case that the reception timings of the DCI of the respective panels are different.

Note that the scheduling offsets 1 and 2 shown in the respective embodiments of the present disclosure may be equal to or different from each other.

The scheduling offset thresholds shown in the examples in the respective embodiments of the present disclosure are common regardless of the panels, but may be different for each panel.

Indexing the CORESET-ID may be common (global) to all the panels (or TRPs or DMRS port groups), or independent for each panel (or TRP or DMRS port group).

For example, assume an example in which CORESET-ID=1 and 2 correspond to the DMRS port group 1, and CORESET-ID=3 and 4 correspond to the DMRS port group 2. In this case, the lowest CORESET-ID is 1. The lowest CORESET-ID of the lowest DMRS port group is 1. The lowest CORESET-ID of the DMRS port group 1 is 1. The lowest CORESET-ID of the DMRS port group 2 is 3.

Note that the DMRS port group may be associated for each CORESET (for example, an RRC information element "ControlResourceSet" may include information on the DMRS port group). Configuration information for the DMRS port group may include information on the corresponding CORESET. For example, information indicating that the DMRS port group 1 corresponds to CORESET-ID=1 and 2 may be configured by the configuration information for the DMRS port group.

The DMRS port group in the present disclosure may include at least one of a DMRS port group for PDSCH, a DMRS port group for PDCCH, a DMRS port group for PBCH, and a DMRS port group for another channel.

The lowest CORESET-ID in the present disclosure may be interpreted as a specific defined CORESET-ID.

Embodiment 2-4

The QCL (QCL assumption) applied to the PDSCH in the case that the scheduling offset is smaller than the scheduling offset threshold as shown in Embodiment 2-1 and Embodiment 2-2 may be referred to as a default QCL (default QCL assumption).

Note that the definition of the default QCL is not limited to this. The default QCL may be, for example, a QCL assumed in a case that a TCI state/QCL specified by way of the DCI cannot be used for a certain channel/signal (for example, PDSCH), or a QCL assumed in a case that a TCI state/QCL is not specified (or configured).

Here, in Rel. 15, the number of DMRS CDM groups without data (number of CDM group(s) without data), an antenna port index (DMRS port(s)) for PDSCH, and the like are specified for the UE based on an antenna port field included in the DCI (DL DCI).

The UE may reference different tables (for example, TS 38.212 Table 7.3.1.2.2-1/2/3/4) depending on a DMRS type that is configured through higher layer signaling (or may be configured by an RRC parameter "dmrs-Type") and a value of a maximum length of the DMRS (that may be configured by an RRC parameter "maxLength"). An entry of the referenced table (the entry corresponds to a set of the number of CDM groups, the antenna port index, and the like) may be determined depending on a value of the above antenna port field.

On the other hand, the inventors of the present invention focused on the entry of the table describe above that is referenced in association with the antenna port field in Rel. 15 including those not used in scheduling the NCJT (multi-PDSCH).

As such, in Embodiment 2-4, in a case that the multi-TRP is scheduled by using the single PDCCH, the UE may support an indication of the antenna port (an indication of the antenna port field included in the DCI) being based on a new DMRS table not defined in Rel. 15 (specifically, determining the entry corresponding to the antenna port field by referencing the new DMRS table).

The UE supporting this processing may determine to use the DMRS table in Rel. 15 or the new DMRS table, based on the TCI field included in the DCI. For example, the UE may determine to use the DMRS table in Rel. 15 in the case that the TCI field indicates one TCI state, or use the new DMRS table in the case that the TCI field indicates two or more TCI states.

Note that in this processing may be applied to only the case that the multi-TRP is scheduled by using the single PDCCH.

The new DMRS table may be referred to as a table for multi-TRP in a single PDCCH based design, a table for single PDCCH based NCJT, merely a table for NCJT, and a DMRS table for Rel-16 or later versions.

The new DMRS table may be, for example, a DMRS table not including an entry that specifies only one port. The entry specifying only one port may be, for example, an entry indicating the number of DMRS CDM groups without data=2, and the antenna port index for PDSCH=0. In other words, the new DMRS table may be structured to include only an entry for two or more ports.

The new DMRS table may be, for example, a DMRS table not including an entry that specifies two or more ports in one CDM group. The entry specifying two or more ports in one CDM group may be an entry indicating, for example, the number of DMRS CDM groups without data=1, and the antenna port index for PDSCH=0, 1. In other words, the new DMRS table may be structured to include only an entry specifying two different CDM ports.

The new DMRS table, in a case that a DMRS type and a maximum length of a DMRS are assumed, the antenna port field of the DCI is preferably structured to have a field size the same as the case in Rel. 15.

The new DMRS table may be the existing table in Rel. 15 to which a new entry is added. In this case, the size of the antenna port field of the DCI may be different from the case in Rel. 15.

[Default QCL+New DMRS Table]

The UE may determine to use the DMRS table in Rel. 15 or the new DMRS table, based on the default QCL described above in addition to or instead of the TCI field. For example, the UE may determine to use the DMRS table in Rel. 15 in the case that the default QCL indicates one QCL or use the new DMRS table in the case that the default QCL indicates two or more QCLs.

Note that the UE may assume the default QCL for a PDSCH in the case that the higher layer parameter "tCI-PresentInDCI" is not configured, or for a PDSCH in the case that the scheduling offset is smaller than the scheduling offset threshold as described in the above embodiment. In the latter case, the default QCL is assumed regardless of whether the higher layer parameter "tCI-PresentInDCI" is configured.

The UE may determine the number of QCLs corresponding to (or specifying) the default QCL based on at least one of the following conditions:
  A search space set receiving the DCI for scheduling the PDSCH (the scheduling DCI) (for example, type of the search space),
  A CORESET receiving the DCI for scheduling the PDSCH (for example, an index of the CORESET, a resource position of the CORESET),
  A certain field of the DCI for scheduling the PDSCH (for example, a TCI field).

For example, in a case that UE receives the above scheduling DCI in a first search space set (for example, a certain common search space set), the UE may assume that the default QCL for the PDSCH scheduled by the DCI always corresponds to one QCL.

In a case that UE receives the above scheduling DCI in the first search space set (for example, a UE-specific search space set), the UE may assume that the default QCL for the PDSCH scheduled by the DCI always corresponds to two or more QCLs.

in a case that UE receives the above scheduling DCI in a specific CORESET (for example, a CORESET zero (a CORESET with an index of 0)), the UE may assume that the default QCL for the PDSCH scheduled by the DCI always corresponds to one QCL.

In a case that UE receives the above scheduling DCI in a CORESET other than the above specific CORESET, the UE may assume that the default QCL for the PDSCH scheduled by the DCI always corresponds to two or more QCLs.

Note that in the case that the multi-TRP is scheduled by using the single PDCCH (single DCI), the UE may assume that the higher layer parameter "tCI-PresentInDCI" is set to enabled. Even in the case in accordance with the default QCL, the UE may determine, based on the TCI field of the DCI, whether the scheduled PDSCH is single TRP (where one TCI state is specified) based or multi-TRP (two or more TCI states are specified) based.

In the case of receiving the DCI, if the UE determines the scheduling offset is smaller than the scheduling offset threshold, the UE may receive the PDSCH in accordance with the default QCL. The UE may, based on the TCI field of the DCI, determine whether to use the new DMRS table for receiving receive the PDSCH to control of decoding the PDSCH.

The UE may assume that, in the case that the higher layer parameter "tCI-PresentInDCI" is set to enabled, the scheduled PDSCH is the multi-PDSCH. The UE may assume that, in a case that higher layer parameter "tCI-PresentInDCI" is not set to enabled, the scheduled PDSCH is the single PDSCH (the PDSCH from the single TRP). In other words, the UE may be semi-statically configured with whether the PDSCH is single TRP based or multi-TRP based.

According to Embodiment 2-4 described above, the UE can dynamically switch the TCI state/QCL assumption for the single TRP and the multi-TRP. The UE can differently use the DMRS table based on whether the multi-TRP is applied or not.

Note that the table in the present disclosure may be interpreted as a correspondence relation based on the table. Specifically, the UE, even if not storing the table itself, may derive the corresponding entry such that the table correspondence relation is met, based on the value of the antenna port field.

According to this embodiment, the UE can appropriately determine one or more default TCI states for the multi-TRP and the multi-DCI.

Embodiment 3

In a case that default spatial relation application conditions are met for a specific UL transmission to the single TRP, the UE may determine a default spatial relation (single default spatial relation, single TRP default spatial relation) for the specific UL transmission.

<<Default Spatial Relation Application Conditions>>

In the case that the default spatial relation application conditions are met, the UE may apply the default spatial relation to the spatial relation for the specific UL transmission. The specific UL transmission may be at least one of a PUSCH, a PUCCH, an SRS, a P-SRS, an SP-SRS, and an A-SRS.

The specific UL transmission may be in a specific frequency range (for example, a frequency range 2 (FR2)), or may be a UL transmission based on a dedicated PUCCH configuration or dedicated SRS configuration except for an SRS with a beam management usage (usage='beamManagement') and an SRS with a noncodebook based transmission usage (usage='nonCodebook') with an associated CSI-RS configuration. The specific UL transmission may be a PUSCH scheduled by DCI format 0_0. For example, the specific UL transmission may be a PUSCH on a cell scheduled by DCI format 0_0 in a case that the PUCCH resource (for example, dedicated PUCCH resource) having the spatial relation (for example, active spatial relation) is not configured within the active UL BWP of the cell. The specific UL transmission may be an SRS based on an SRS resource across a plurality of slots in an SRS resource set of an antenna switching usage (usage='antennaSwitching'). In this case, the UE may apply the default spatial relation to all of the SRS resources in the SRS resource set.

The default spatial relation application conditions may include at least one of the spatial relation information for the specific UL transmission being not configured, the specific UL transmission being in the frequency range (for example, the frequency range 2 (FR2)), the UL transmission being based on the dedicated PUCCH configuration or dedicated SRS configuration except for an SRS with the beam management usage (usage='beamManagement') and an SRS with the noncodebook based transmission usage (usage='nonCodebook') with the associated CSI-RS configuration, and the UE supporting beam correspondence. The spatial relation information for the specific UL transmission may be spatial relation information in the dedicated PUCCH configuration or dedicated SRS configuration. The associated CSI-RS may be an ID (index) of a CSI-RS resource associated with an SRS resource set in the non-codebook based transmission.

The default spatial relation application conditions may include the pathloss reference RS being not configured for the specific UL transmission. The default spatial relation application conditions may include the pathloss reference RS being not configured for the specific UL transmission through higher layer signaling.

The default spatial relation application conditions may include only one TCI state being active for a PDCCH (the number of active TCI states for the PDCCH is one). According to the default spatial relation application conditions, the UE operation is simplified.

The default spatial relation application conditions may include only one TCI state being active for a PDCCH and PDSCH (the number of active TCI states for the PDCCH and PDSCH is one). In a case that a single active beam is used for UL and DL, the UE operation is simplified.

The default spatial relation application conditions may include a PDCCH and a PUCCH scheduled by the PDCCH being in the same BWP or the same CC (the cross carrier scheduling is not used). In the case of the cross carrier scheduling, the UE cannot necessarily apply the same beam to the PDCCH and the PUCCH, and thus, the cross carrier scheduling is excluded to simplify the UE operation. For example, in a case of inter-band carrier aggregation (CA), different beams may be applied to a PDCCH and a PUCCH. For example, in a case of FR1-FR2 CA, if the DCI is in the FR1 and a PUCCH or an SRS or a PUSCH is in the FR2, the UE may not determine the beam.

The default spatial relation application conditions may include the inter-band CA being not used.

default spatial relation application conditions may include an SRI for a specific UL transmission PUSCH being absent. The default spatial relation application conditions may include an SRS resource corresponding to an SRI for PUSCH being absent.

The default spatial relation application conditions may include the spatial relation information being not configured for at least one SRS resource in an SRS resource set.

<<Default Spatial Relation>>

The default spatial relation may be a QCL RS for a specific DL resource.

A QCL RS for a specific DL resource, a default TCI state or default QCL assumption for a specific DL resource, a TCI state of a CORESET with the lowest CORESET ID in the most recent slot, an RS with respect to a QCL parameter used for PDCCH QCL indication of a CORESET associated with a monitored search space with the lowest CORESET-ID in the latest slot in which one or more CORESETs within an active BWP of a serving cell are monitored by the UE, a TCI state or QCL assumption for a CORESET associated with a monitored search space with the lowest CORESET-ID in the latest slot, a TCI state or QCL assumption for a CORESET associated with a monitored search space with the lowest CORESET-ID in a specific slot, a TCI state or QCL assumption for a specific CORESET, a TCI state or QCL assumption for a DL signal corresponding to a specific UL transmission (for example, a DL channel triggering a specific UL transmission, a DL channel scheduling a specific UL transmission, a DL channel scheduling a DL channel corresponding to a specific UL transmission), an RS with respect to a QCL parameter for a specific DL resource, and a QCL RS for a specific DL resource may be interchangeably interpreted.

The RS for the default spatial relation or the default TCI state or the default QCL assumption may be a QCL type D RS or a QCL type A RS, or, if applicable, a QCL type D RS or a QCL type A RS.

The latest slot may be the latest slot for a specific DL resource. The latest slot may be the latest slot for (or before) a starting symbol of a specific UL transmission. The latest slot may be the latest slot for (or before) the first or last symbol of a DL signal corresponding to a specific UL transmission. For example, in a case that the specific UL transmission is a PUCCH, the DL signal corresponding to the specific UL transmission may be a PDSCH corresponding to the PUCCH (a PDSCH corresponding to a HARQ-ACK carried on the PUCCH).

The default spatial relation may be any of default spatial relations 1 to 5 below.

[Default Spatial Relation 1]

The default spatial relation may be a default TCI state or default QCL assumption for PDSCH.

The default spatial relation may be a default TCI state for PDSCH or a default QCL assumption for PDSCH. In a case that a CORESET is configured on a CC to which the default spatial relation is applied, the default TCI state for PDSCH or the default QCL assumption for PDSCH may be a TCI state corresponding to the lowest CORESET ID in the most recent (or the latest) slot or the most recent search space. In a case that any CORESET is not configured on a CC to which the default spatial relation is applied, the default TCI state for PDSCH or the default QCL assumption for PDSCH may be an activate TCI state with the lowest ID applicable to the PDSCH in the active DL BWP of the CC.

The specific DL resource may be a PDSCH.

[Default Spatial Relation 2]

The default spatial relation may be one of active TCI states (activated TCI states) for a CORESET.

A plurality of TCI states may be active for a CORESET. In this case, the active TCI state selected as the default spatial relation may be the default RS, or the default TCI state or the default QCL assumption.

The specific DL resource may be a PDCCH.

[Default Spatial Relation 3]

In the case that the specific UL transmission corresponds to a PDCCH (in the case that the specific UL transmission is scheduled or triggered by the PDCCH (DL DCI) for scheduling a PDSCH), the default spatial relation for the specific UL transmission may be a TCI state for the PDCCH. The specific UL transmission may be an A-SRS triggered by the PDCCH, or a PUCCH carrying a HARQ-ACK for a PDSCH scheduled by the PDCCH. For example, in the case that the specific UL transmission is an A-SRS, the PDCCH corresponding to the specific UL transmission may be a PDCCH triggering the A-SRS. For example, in the case that the specific UL transmission is a PUCCH carrying a HARQ-ACK, the PDCCH corresponding to the specific UL transmission may be a PDCCH scheduling a PDSCH and indicating a timing of a HARQ-ACK for the PDSCH. In a case that the specific UL transmission does not correspond to a PDCCH, the default spatial relation may be the default spatial relation 1 described above.

The specific DL resource may be a PDCCH or a PDSCH.

[Default Spatial Relation 4]

The default spatial relation may be a QCL assumption for CORESET #0 (a CORESET having the ID of 0).

The specific DL resource may be CORESET #0.

[Default Spatial Relation 5]

The default spatial relation may be a pathloss reference RS.

The default spatial relation may be an RS used for pathloss calculation. An RS used for pathloss calculation, an RS resource used for pathloss calculation, and a calculation RS may be interchangeably interpreted. The calculation RS may be an RS resource obtained from a SS/PBCH block that is used by the UE for acquiring a MIB. For example, the calculation RS may be the pathloss reference RS. For example, in a case that pathloss reference RS information (pathlossReferenceRSs) for the specific UL transmission is not given, or the UE is not given a dedicated higher layer parameter, the calculation RS may be an RS resource obtained from a SS/PBCH block that is used by the UE for acquiring a MIB. The calculation RS may be a pathloss reference RS having the index of 0 in the pathloss reference RS information (a list of pathloss reference RS). For example, in a case that the UE is given the pathloss reference RS information (pathlossReferenceRSs in PUCCH power control information (PUCCH-PowerControl)) and is not given the PUCCH spatial relation information (PUCCH-SpatialRelationInfo), the calculation RS may be a reference signal (referenceSignal) in a pathloss reference RS for PUCCH from a pathloss reference RS-ID for PUCCH (PUCCH-PathlossReferenceRS-Id) having an index of 0 in pathloss reference RS information for PUCCH (PUCCH-PathlossReferenceRS).

In the case that the pathloss reference RS for the specific UL transmission is not configured through higher layer signaling, the UE may use the calculation RS for the default spatial relation for the specific UL transmission.

In the case that the pathloss reference RS for the specific UL transmission is not configured through higher layer signaling, the UE may use the configured pathloss reference RS for the default spatial relation for the specific UL transmission.

The specific DL resource may be a pathloss reference RS.

The default spatial relation may be a QCL RS for the specific DL resource.

<<Default Spatial Relation for Multi-TRP>>

In a case that the UE is configured with the MULI-TRP and the default spatial relation application conditions are met, the UE may use one or more default spatial relations to the specific UL transmission for the multi-TRP. The UE being configured with the multi-TRP may include at least one the UE being configured with a PDSCH reception from the multi-TRP, and the UE being configured with the specific UL transmission to the multi-TRP.

The UE may determine, based on the TCI state for at least one of the TRPs determined according to Embodiment 1 and Embodiment 2, the default spatial relation for the specific UL transmission for the at least one TRP. In the case that the UE determines one TCI state for one TRP according to Embodiment 1 and Embodiment 2, the UE may determine one default spatial relation for the relevant one TRP. In a case that the UE determines two TCI states respectively corresponding to two TRPs according to Embodiment 1 and Embodiment 2, the UE may determine two default spatial relations respectively corresponding to the relevant two TRPs.

The UE may determine the default TCI state for PDSCH (UE receive beam) for at least one TRP based on Embodiment 1 and Embodiment 2 to use the determined default TCI state (UE transmit beam) for the default spatial relation for the specific UL transmission for the TRP. The UE may determine the default TCI state for each of one or two TRPs for the multi-PDSCH based on the single DCI, based on Embodiment 1, to use the determined default TCI state for the default spatial relation for the specific UL transmission to the TRP. The UE may determine the default TCI state for each of one or two TRPs for the multi-PDSCH based on the multi-DCI, based on Embodiment 2 to use the determined default TCI state for the default spatial relation for the specific UL transmission to the TRP.

The default spatial relation for the specific UL transmission for at least one TRP may be different from the default TCI state for the PDSCH for the TRP. The UE may determine the default TCI state for at least one TRP in accordance with one operation determination method (for example, any one of Options 1 to 4) in Embodiment 1, and determine the default spatial relation for the TRP in accordance with another operation determination method in Embodiment 1.

The default spatial relation for the UL transmission of one kind (any of PUCCH, SRS, and PUSCH) may be different from the default spatial relation for the UL transmission of another kind. The UE may determine the default spatial relation for the UL transmission of one kind in accordance with one operation determination method (for example, any of Options 1 to 4) in Embodiment 1, and determine the default spatial relation for the UL transmission of another kind in accordance with another operation determination method in Embodiment 1.

The UE may determine the default TCI states for the multi-PDSCH based on the single DCI (scheduled by the single DCI) in accordance with Embodiment 1 to use the determined default TCI states for the default spatial relations for a plurality of specific UL transmissions based on the single DCI (scheduled or triggered by the single DCI). The UE may determine the default TCI states for the multi-PDSCH based on the multi-DCI (scheduled by the multi-DCI) in accordance with Embodiment 2 to use the determined default TCI states for the default spatial relations for a plurality of specific UL transmissions based on the multi-DCI (scheduled or triggered by the multi-DCI).

The default spatial relation may be the same for a plurality of traffic types (for example, any of eMBB, URLLC scheme 1a, URLLC scheme 2a, URLLC scheme 2b, URLLC scheme 3, and URLLC scheme 4). The UE may determine the default spatial relations for the UL transmissions of a plurality of traffic types in accordance with one operation determination method (for example, any of Options 1 to 4) in Embodiment 1.

The default spatial relation for the UL transmission of one traffic type (for example, any of eMBB, URLLC scheme 1a, URLLC scheme 2a, URLLC scheme 2b, URLLC scheme 3, and URLLC scheme 4) may be different from the default spatial relation for the UL transmission of another traffic type. The UE may determine the default spatial relation for the UL transmission of one traffic type in accordance with one operation determination method (for example, any of Options 1 to 4) in Embodiment 1, and determine the default spatial relation for the UL transmission of another traffic type in accordance with another operation determination method in Embodiment 1.

According to this Embodiment 3, the UE can appropriately determine one or more default spatial relations for the multi-TRP.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 8:
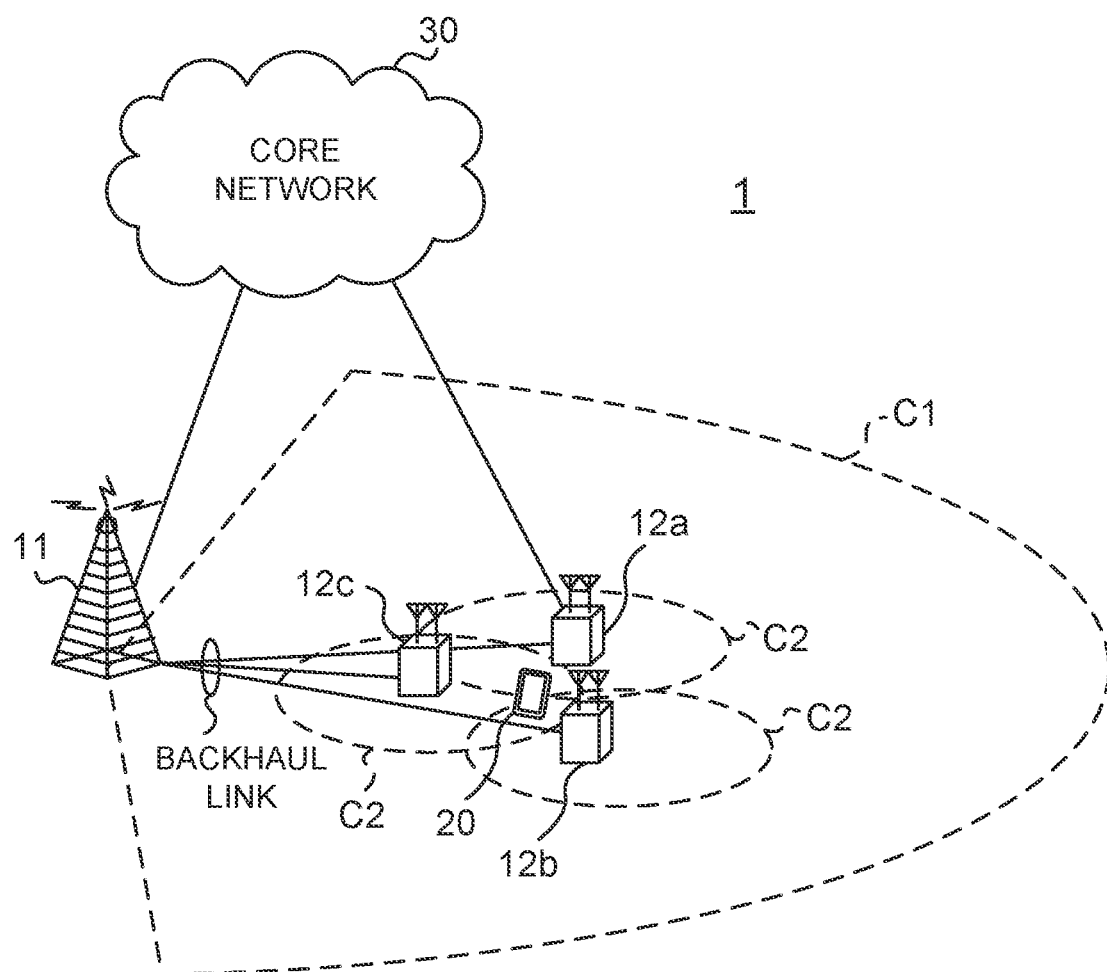
FIG. 8 is a diagram to show an example of a schematic structure of a radio communication system according to one embodiment.

FIG. 8 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 9:
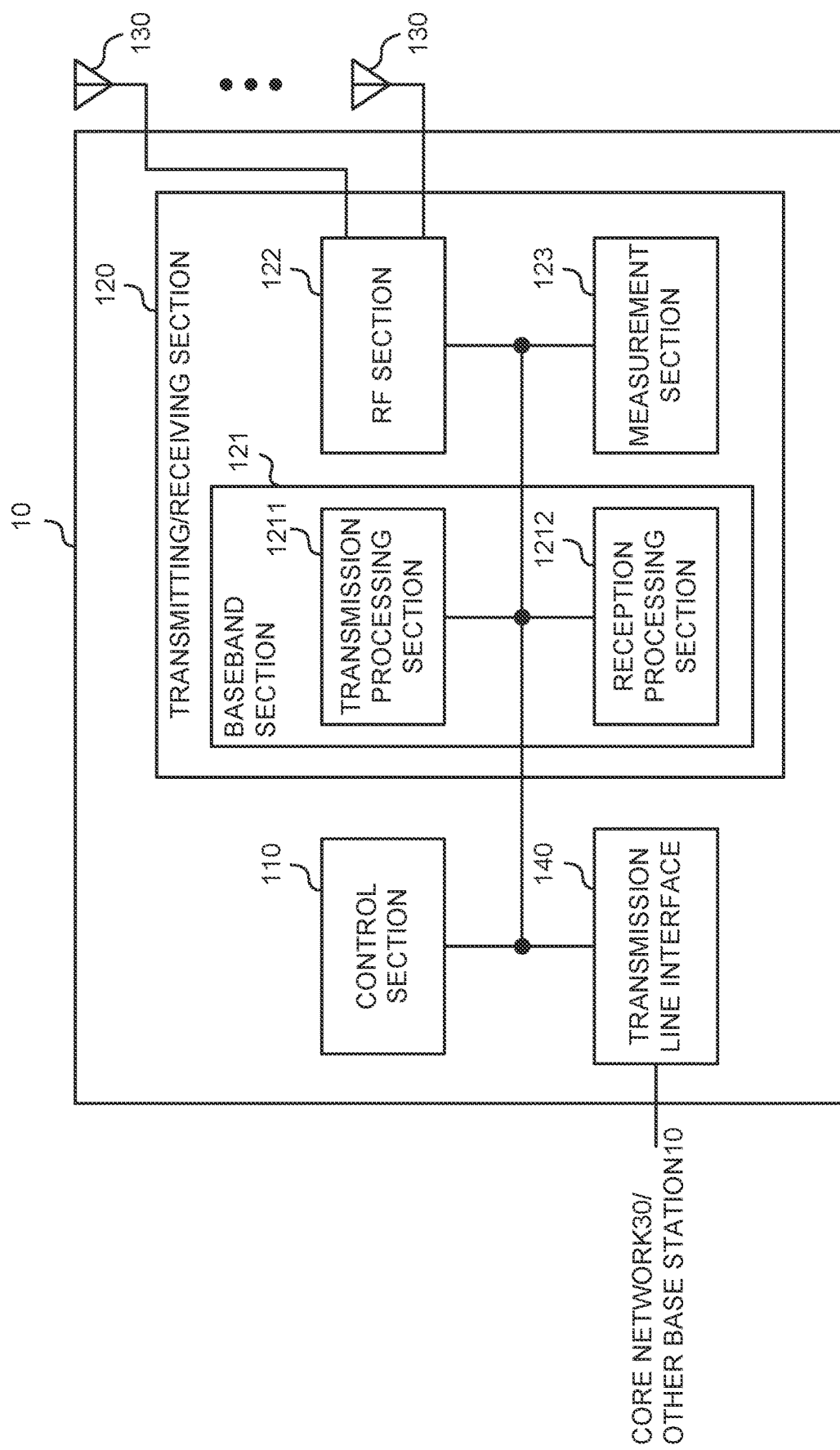
FIG. 9 is a diagram to show an example of a structure of a base station according to one embodiment.

FIG. 9 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

Note that the transmitting/receiving section 120 may transmit one or both a plurality of downlink shared channels (Physical Downlink Shared Channels (PDSCHs))(multi-PDSCH) scheduled based on one piece of downlink control information (single PDCCH).

(User Terminal)

Figure 10:
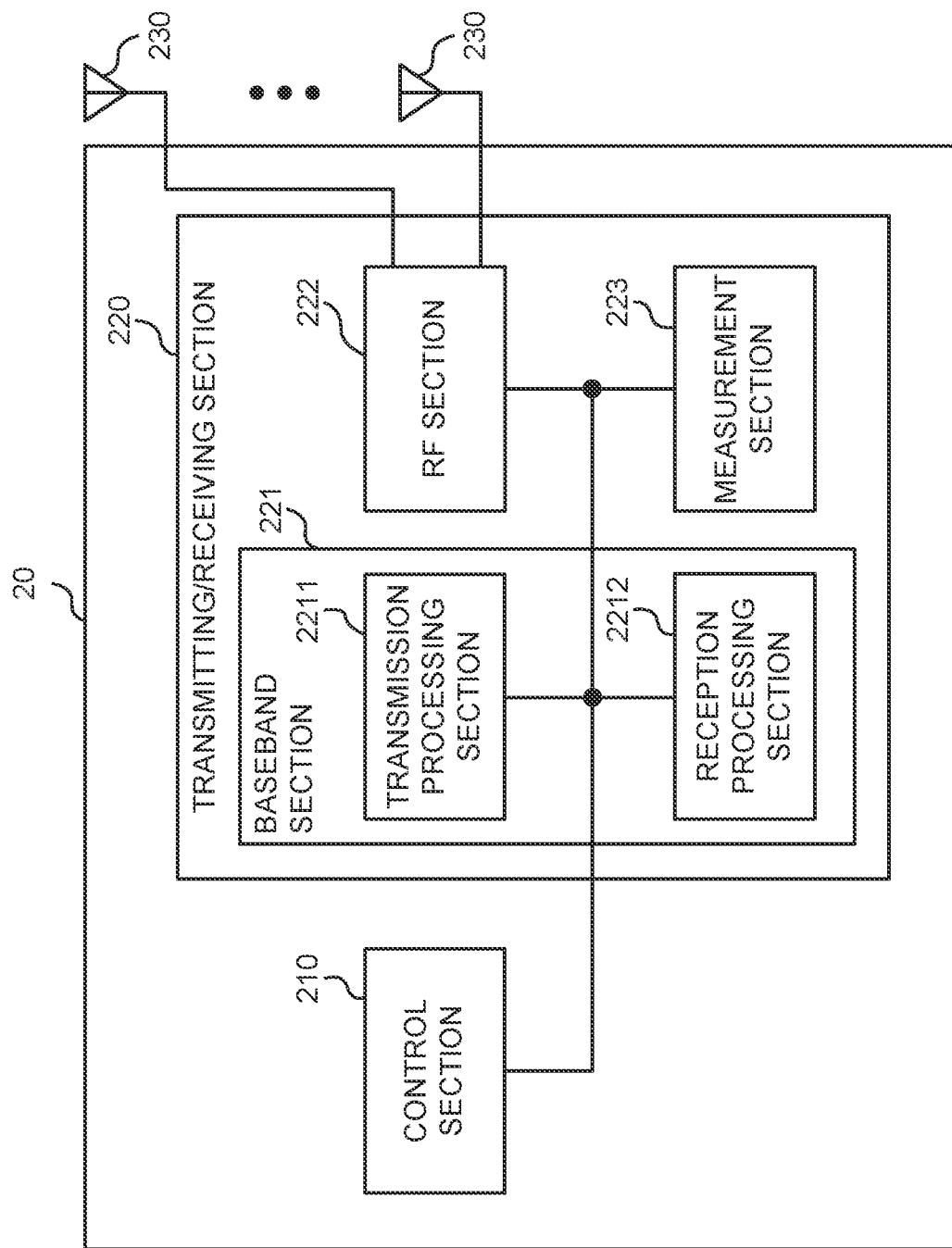
FIG. 10 is a diagram to show an example of a structure of a user terminal according to one embodiment.

FIG. 10 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform in a case that transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

The transmitting/receiving section 220 may receive one piece of downlink control information (DCI) for scheduling a plurality of downlink shared channels (PDSCHs). The control section 210 may determine either a single TCI state or a plurality of TCI states for the plurality of PDSCHs in at least one of a first case and a second case, the first case being a case that a time offset from the DCI to the plurality of PDSCHs is shorter than a threshold, the second case being a case that a transmission configuration indication (TCI) field is not configured.

In at least one of the first case and the second case, the control section 210 may always determine the single TCI state, or may always determine the plurality of TCI states.

In the first case, the control section 210 may determine either the single TCI state or the plurality of TCI states, based on the number of TCI states corresponding to a specific TCI codepoint in TCI codepoints activated by a medium access control (MAC) control element (CE).

In at least one of the first case and the second case, the control section 210 may determine either the single TCI state or the plurality of TCI states, based on either a higher layer parameter indicating which one of the single TCI state and the plurality of TCI states are determined, or a higher layer parameter for reference signal configuration.

A method for determining either the single TCI state or the plurality of TCI states may be different depending on either a traffic type or a plurality of PDSCH schemes.

In a case that reception of a plurality of downlink shared channels (PDSCHs) using the plurality of transmission configuration indication (TCI) states is configured, and spatial relation information is not configured for a specific UL transmission, the control section 210 may determine those one or more spatial relations for the specific UL transmission. The transmitting/receiving section 220 may perform the specific UL transmission used for those one or more spatial relations.

The control section 210 may determine one or more TCI states for the plurality of PDSCHs in at least one of a first case and a second case to use those one or more TCI states for those one or more spatial relations, the first case being a case that a time offset from one or more pieces of downlink control information (DCI) to a corresponding downlink shared channel (PDSCH) is shorter than a threshold, the second case being a case that a transmission configuration indication (TCI) field is not configured.

The control section 210 may determine one or more TCI states for the plurality of PDSCHs in at least one of a first case and a second case to determine a TCI state different from those one or more TCI states as for those one or more spatial relations, the first case being a case that a time offset from one or more pieces of downlink control information (DCI) to a corresponding downlink shared channel (PDSCH) is shorter than a threshold, the second case being a case that a transmission configuration indication (TCI) field is not configured.

A method for determining those one or more TCI states may be different depending on at least one of a traffic type of the specific UL transmission, a kind of the specific UL transmission, and whether the specific UL transmission is based on a single DCI or a plurality of pieces of DCI.

The control section 210 may determine a single spatial relation for those one or more specific UL transmissions in the case of determining the single TCI state for the plurality of PDSCHs, and may determine a plurality of spatial relations for those one or more specific UL transmissions in the case of determining the plurality of TCI states for the plurality of PDSCHs.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining software into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 11:
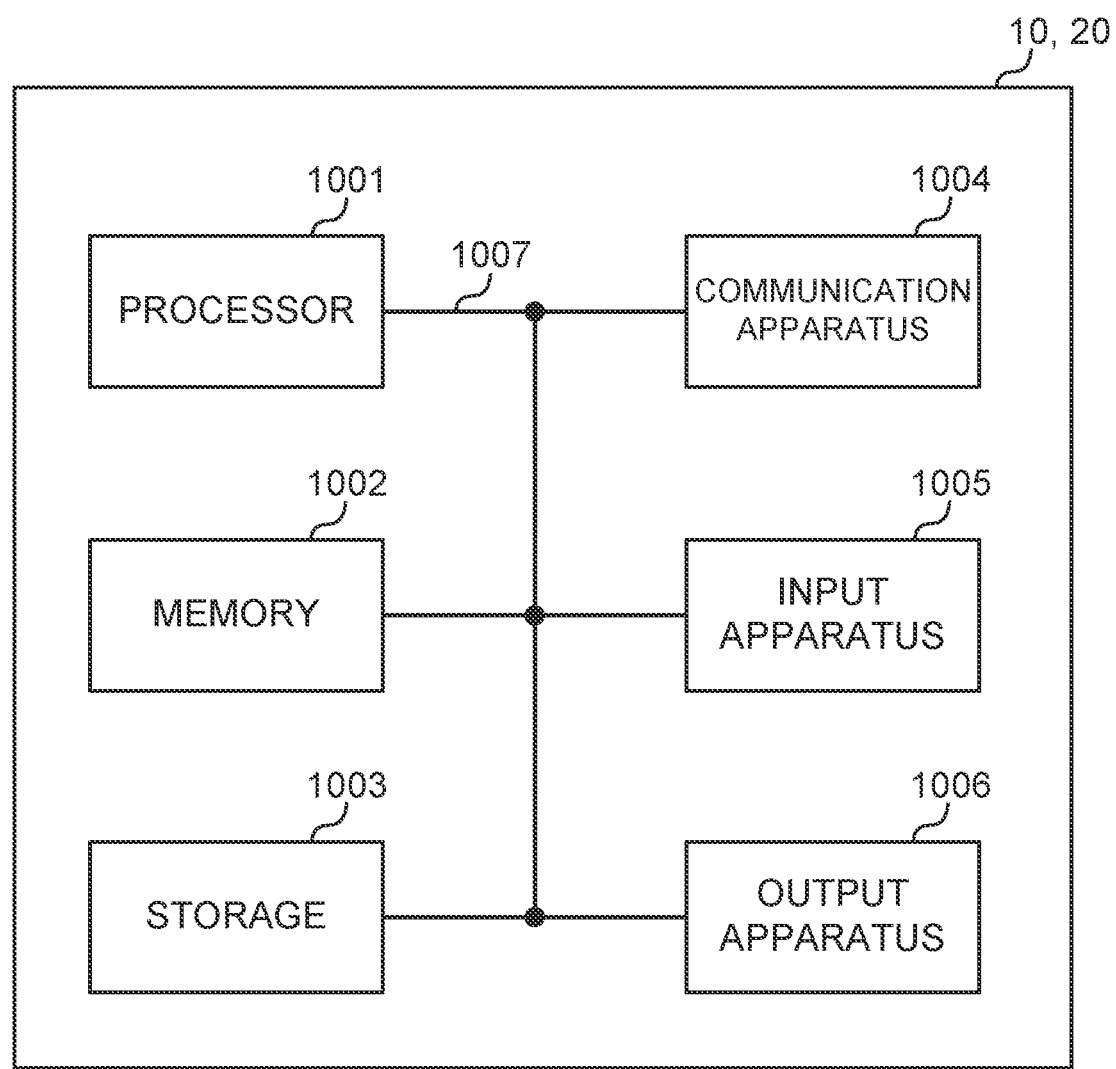
FIG. 11 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 11 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, notification of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be notified using, for example, MAC control elements (MAC CEs).

Also, notification of certain information (for example, notification of "X holds") does not necessarily have to be notified explicitly, and can be notified implicitly (by, for example, not notifying this certain information or notifying another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a "small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a moving object or a moving object itself, and so on. The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
    a receiver that receives a medium access control control element (MAC CE); and
    a processor that controls, based on a number of transmission configuration indication (TCI) states corresponding to a certain TCI codepoint, among a plurality of TCI codepoints configured by the MAC CE, to perform either a single transmission/reception point (TRP) operation or a multi-TRP operation,
    wherein when performing the single TRP operation, the processor determines a number of code division multiplexing (CDM) groups and DMRS ports based on a first DMRS table, and when performing the multi-TRP operation, the processor determines a number of CDM groups and DMRS ports based on a second DMRS table that differs from the first DMRS table.

2. The terminal according to claim 1, wherein when the number of TCI states corresponding to the certain TCI codepoint is one, the processor controls to perform a single TRP operation, and when the number of TCI states corresponding to the certain TCI codepoint is two, the processor controls to perform a multi-TRP operation.

3. The terminal according to claim 2, wherein the certain TCI codepoint is a smallest or largest TCI codepoint among the plurality of TCI codepoints.

4. The terminal according to claim 1, wherein the certain TCI codepoint is a smallest or largest TCI codepoint among the plurality of TCI codepoints.

5. The terminal according to claim 1, wherein a number of entries in the second DMRS table is greater than a number of entries in the first DMRS table.

6. A radio communication method for a terminal, comprising:
  receiving a medium access control control element (MAC CE); and
  controlling, based on a number of transmission configuration indication (TCI) states corresponding to a certain TCI codepoint, among a plurality of TCI codepoints configured by the MAC CE, to perform either a single transmission/reception point (TRP) operation or a multi-TRP operation,
  wherein when performing the single TRP operation, determining a number of code division multiplexing (CDM) groups and DMRS ports based on a first DMRS table, and when performing the multi-TRP operation, determining a number of CDM groups and DMRS ports based on a second DMRS table that differs from the first DMRS table.

7. A system comprising a terminal and a base station, wherein
  the terminal comprises:
    a receiver that receives a medium access control control element (MAC CE); and
    a processor that controls, based on a number of transmission configuration indication (TCI) states corresponding to a certain TCI codepoint, among a plurality of TCI codepoints configured by the MAC CE, to perform either a single transmission/reception point (TRP) operation or a multi-TRP operation,
    wherein when performing the single TRP operation, the processor determines a number of code division multiplexing (CDM) groups and DMRS ports based on a first DMRS table, and when performing the multi-TRP operation, the processor determines a number of CDM groups and DMRS ports based on a second DMRS table that differs from the first DMRS table, and
  the base station comprises:
    a transmitter that transmits the MAC CE.

\* \* \* \* \*